United States Patent [19]
Washio et al.

[11] Patent Number: 5,953,127
[45] Date of Patent: Sep. 14, 1999

[54] DEVICE FOR MEASURING DIMENSIONS OF WORKPIECES

[75] Inventors: Isomi Washio, Meerbusch; Werner Latten, Oerlinghausen, both of Germany

[73] Assignees: Advanced Technik GmbH, Haan, Germany; Amada Company, Limited, Kanagawa, Japan

[21] Appl. No.: 09/007,070

[22] Filed: Jan. 14, 1998

Related U.S. Application Data

[62] Division of application No. 08/490,452, Jun. 14, 1995.

[51] Int. Cl.$^6$ .......................... G01B 11/02; G01B 11/24
[52] U.S. Cl. .......................................... 356/383; 356/376
[58] Field of Search ................................. 356/379, 380, 356/383–387; 33/549, 555, 556; 198/339.1; 73/149, 865.8

[56] References Cited

U.S. PATENT DOCUMENTS

| | | |
|---|---|---|
| 3,513,321 | 5/1970 | Sherman . |
| 3,805,393 | 4/1974 | Lemelson .............................. 33/174 L |
| 3,983,403 | 9/1976 | Dahlström et al. . |
| 4,063,820 | 12/1977 | Borgese . |
| 4,197,888 | 4/1980 | McGee et al. ...................... 144/209 A |
| 4,379,477 | 4/1983 | Shrum . |
| 4,785,193 | 11/1988 | Dassler et al. .......................... 250/560 |
| 4,905,512 | 3/1990 | Hayashi . |
| 4,913,551 | 4/1990 | Davis . |

FOREIGN PATENT DOCUMENTS

| | | |
|---|---|---|
| 3318420 C2 | 11/1984 | Germany . |
| 1 298 681 | 3/1969 | United Kingdom . |

*Primary Examiner*—Frank G. Font
*Assistant Examiner*—Michael P. Stafira
*Attorney, Agent, or Firm*—Blank, Rome, Comisky & McCauley LLP

[57] ABSTRACT

There is disclosed a device for measuring dimensions of workpieces, particularly rod shaped workpieces. The device includes a supporting means for supporting and roughly aligning the workpieces, a measuring mean for detecting the length of the workpiece, and a control unit including memory means for storing the measured values. The measuring device of the present invention is characterized in that the measuring means (1, 103) is provided with a sensor means (6, 104) for detecting dimensions of a cross-section of the workpiece (1, 101).

9 Claims, 21 Drawing Sheets

FIG. 5

| POSITION OF GUIDANCE / FORM OF WORKPIECE | | |
|---|---|---|
| ⌀D, L, M (circle) | ON/OFF — ON/OFF, a, L=⌀D | ON/OFF — ON/OFF, M |
| ⌀D, L, M, t (circle with t) | ON/OFF, t, a, L=⌀D | ON/OFF, M |
| L, H, B, W | ON/OFF, L=H/sinB, H=LxsinB | ON/OFF, W |
| t, L, H, B, C | ON/OFF, c=t, t=cxsinB, L=H/sinB, H=LxsinB | ON/OFF, c=t, W |

DEVICE FOR MEASURING DIMENSIONS OF WORKPIECES

This is a divisional application of allowed application Ser. No. 08/490,452, filed Jun. 14, 1995.

TECHNICAL FIELD

The present invention relates to a device for measuring dimensions of workpieces, which device includes a supporting means for supporting and roughly aligning the workpiece, a measuring means for detecting the length of the workpiece, and a control unit including memory means for storing the measured values.

BACKGROUND ART

DE 33 18 420 discloses a device for measuring the length of rods which are stored within the scope of an automated stock management. In this device the respective lengths of the rods are stored in a stock management computer. Thus, a suitable workpiece, whose total length corresponds to the individual pieces to be made, is chosen in an independent manner with the aid of the stock management computer for a subsequent manufacturing order, for instance for processing in a sawing machine. To determine the length of the rod, a length measuring device senses the distance of the front sides of the workpiece from a reference point. The length measuring device has a stop and a slide which is opposite to the stop at a distance and movable relative thereto for pushing the rod to be measured onto the stop. The resultant distance of the slide from the stop corresponds to the length of the workpiece to be measured and is stored in the stock management computer so that it is assigned to the respective workpiece.

It is however disadvantageous that the rod must be brought into a defined position for the measurement, namely into contact with the fixed stop, and a supporting means which supports the rod must at least permit a displacement of the rod in the longitudinal direction and must be arranged accordingly. Moreover, with the known device it is not possible to measure cross sections or to determine a straightness of the rod. Thus, on the one hand, the automated stock management cannot make a distinction between rods of full material, hollow profiles or cornered or round cross-sections, and on the other hand, excessively bent rods might be supplied to the manufacturing process so that required shape tolerance cannot be achieved with such rods, and when preset limit values are exceeded, the rods may cause damage during the storing process or when supplied to the cutting-off machine.

Furthermore, a device is known wherein a measuring roll presses against the rod and is rolled along the rod for determining the length of the rod. At the same time, the setting height of the measuring roll is detected via an NC axis and the thickness of the material is determined. This device, however, has the following disadvantages. First, it is only the height, but not the shape or width of the rod, that can be determined. Second, the length of the rod can only be determined with great tolerance due to different material surfaces, such as round or flat, smooth or scaled surfaces and also due to a rolling of the measuring roll at the rod end during transition from the horizontal movement into the vertical movement. A straightness of the rod can also not be determined with the known device. Moreover, in this device too, the rod must be pushed at one side against a stop, resulting in the above-mentioned disadvantages.

DISCLOSURE OF INVENTION

It is the object of the present invention to improve a device of the above-mentioned type in such a manner that the geometry of the workpiece can be determined in a sufficiently accurate manner to select a workpiece from the stock for a specific manufacturing order.

In a device of the above-mentioned kind, this object is attained according to the invention by the provision of a measuring means provided with a sensor means for detecting a cross-section. In an advantageous embodiment, the measuring means is further provided with a sensor means for detecting a straightness of the workpiece.

The device of the invention is especially characterized in that the best suited workpiece can respectively be chosen with increased differentiation for a manufacturing order to be executed within the scope of an automated stock management. Since the workpiece to be stored can be classified not only with respect to their length, but can also be distinguished with respect to their cross section and their straightness, manufacturing orders can be executed substantially independently and with increased efficiency. The measured values which are stored in the memory means in addition to the workpiece length, for instance height, width, round cross-section or square cross-section or straightness of the workpiece and also wall thickness in the case of hollow bodies, enable the control unit to select a suitable workpiece from the stock and to supply it to the processing machine. Thus possible faulty data input by the operator will be recognized, and input of such data by the operator can be dispensed with entirely.

An advantageous development of the invention is that the sensor means is provided with a measuring head slidably supported on a guiding device and drivable by a driving means, and a path measuring device is provided for detecting the position of the measuring head relative to the guiding device. As long as the workpiece rests on the supporting means, the measuring head is moved along the surfaces of the workpiece to be measured. The path measuring device senses the distance traveled by the measuring head during scanning, thereby determining the respective geometrical data, such as workpiece length, width, or height.

In an advantageous embodiment, the measuring head is slidably guided on a longitudinal guidance extending in the longitudinal direction of the supporting means and in a plane perpendicular to the longitudinal guidance. The measuring head can thus be guided past the lateral surface of the workpiece, on the one hand, for determining the length or straightness of the workpiece in the longitudinal direction of the workpiece, and past the front surfaces thereof, on the other hand, for determining the cross-section of the workpiece in directions perpendicular to the longitudinal direction.

In the advantageous development, the workpiece has just to be aligned roughly in its orientation for being measured and an exact positioning is not required. The sensor means preferably includes a laser sensor. The workpiece can thus be scanned without contact. The laser sensor in particular detects the distance between the measuring head and a surface of an object by which the laser beam is reflected therefrom. When the measuring head is guided past the front surface of the workpiece or the lateral surface thereof, a first signal change which corresponds to a beginning of the workpiece contour takes place upon impingement of the laser beam on the material. Like the subsequent signal changes, the signal change is used during continued travel past the surface of the material for determining the distance of the material surface from the measuring head and for determining the geometrical dimensions of the workpiece.

In accordance with an advantageous embodiment the control unit includes an evaluating unit for linking measured path data of the path measuring device with laser beam measuring signals of the laser sensor to determine the cross-sectional dimensions and straightness of the workpiece.

An advantageous embodiment of the invention is also given by the fact that there is provided with two linear guidances in the plane perpendicular to the longitudinal guidance. A first one of the two linear guidance is preferably supported slidably at least in the longitudinal direction on the longitudinal guidance, and a second one carrying the measuring head is supported on the first linear guidance for sliding in two directions in the plane perpendicular to the longitudinal guidance. Alternatively, the measuring head is slidably guided on the second linear guidance, which is slidably guided on the first linear guidance. Further, the first linear guidance may be slidably guided on the longitudinal guidance in the plane perpendicular to the longitudinal direction as well as slidably guided in the longitudinal direction on the longitudinal guidance.

The measuring head can thus be moved in any desired direction if individual driving means for driving linear guidances are correspondingly operated. In particular, the measuring head of the laser sensor is movable in different directions in a plane perpendicular to the longitudinal direction of the workpiece in order to detect the cross-sectional geometry of the workpiece in accordance with a suitable algorithm in several scanning operations. In the scanning operations, first and last signal changes are respectively measured and localized. Apart from the determination of the cross-sectional dimensions, such as height and width, a distinction can be made between round material and flat material or full profiles and hollow profiles. Optionally, a determination of the wall thicknesses of the workpiece can also be made. The determination of the cross-section of the workpiece with complicated cross-sectional geometries is also possible by comparing the measured values with data from a profiled material data base. After the front surface of the workpiece has been scanned, the whole cross slide is moved along the longitudinal guidance to scan the lateral surface of the workpiece in the longitudinal direction thereof with the aid of the laser sensor so as to determine the length of the workpiece on the one hand and to determine straightness and inclined position of the workpiece on the other hand.

In an especially advantageous embodiment of the invention, the path measuring device is provided with a first path measuring sensor for detecting the position of the first linear guidance relative to the longitudinal guidance, a second path measuring sensor for detecting the position of the second linear guidance relative to the first linear guidance and/or a third path measuring sensor for detecting the position of the measuring head relative to the second linear guidance. As a result, the positions where the signal changes occur can exactly be located, and the length of displacement within which a signal change takes place can be determined exactly, so that the geometrical data derived therefrom can precisely be calculated. Further, it is possible to measure the distance of the measuring head from the material surface at fixed intervals when the cross slide slides along the longitudinal guidance for scanning the lateral surface of the workpiece in the longitudinal direction. The respectively measured laser data and the associated measured path data are linked by the control unit for calculating straightness and inclined position of the workpiece on the supporting means.

An advantageous embodiment of the invention is that the driving means is provided with a toothed belt drive to which an encoder is coupled. The position of the measuring head can be determined by the encoder in a very exact manner, so that the measurement of dimensions and/or shape of a workpiece is virtually faultless.

A preferred development of the invention is characterized in that a pivotal arm guidance with at least two pivotal arms is provided for guiding the measuring head in the plane perpendicular to the longitudinal direction of the workpiece. The pivotal arm guidance is slidably supported on the longitudinal guidance in the longitudinal direction. A first pivotal arm is pivotal relative to the longitudinal guidance about a first axis parallel to the longitudinal direction, and a second pivotal arm is pivotal relative to the first pivotal arm about a second axis also parallel to the longitudinal direction. In a way similar to that of the above-mentioned cross slide guidance, such a pivotal arm guidance can guide the measuring head in any desired directions past the front surface of the workpiece to detect the contours of the workpiece. The pivotal arm guidance is moved along the longitudinal guidance after the two pivotal arms have brought the measuring head into a suitable position for measuring the length and for determining the straightness of the workpiece. In this way, the measuring head is moved along the lateral surface of the workpiece in the longitudinal direction thereof. By analogy with a pivotal arm robot, the two pivotal arms are driven to pivot about individual pivot axes. The position of the measuring head is sensed by sensors for sensing the angular positions of the pivotal arms relative to each other.

In an advantageous embodiment of the invention, a swinging means is provided for swinging the measuring head relative to the guiding device. With this swinging means, when both the front surface and the lateral surface of a workpiece are to be scanned, the measuring head of the sensor means is always brought into an angular position perpendicular to the surface member to be scanned, so that a laser beam reflected by the surface can be detected optimally. The guiding device can be constructed in a very simple manner owing to the swinging means. This is because the guiding device has only to move the measuring head of the sensor means to the locations in the space and because the orientation, i.e. the angular position of the measuring head relative to the workpiece, is adjusted by the swinging means.

With the swinging means, it is easily possible to scan the front surface and the lateral surface of the workpiece with a single sensor means or a single measuring head. However, it is also possible to provide two or generally several measuring heads on the guiding device so as to scan the differently oriented workpiece surfaces with different measuring heads.

In accordance with a preferred embodiment of the invention the measuring head is swingable about two axes. The measuring head is thereby swingable, for complicated workpiece contours, into positions respectively perpendicular to the workpiece surface sections to be scanned, so that the workpiece can be scanned along several lines.

In a preferred embodiment the swinging means is provided with two series connected swinging members which are each swingable about a swinging axis by 90° between two positions. The swinging members are disposed in such a manner that the swinging axes of the two swinging members are perpendicular to each other. Such a series connection permits the use of standardized and therefore inexpensive swinging means, such as compressed-air adjusting means which offer adequate accuracy at a low price.

In a further advantageous embodiment of the invention, first and second measuring means are provided for detecting the distance of a first front surface and an opposite second front surface of the workpiece, which is supported on the supporting means, from a reference point. In this embodiment, the workpiece has also just to be aligned roughly in its orientation and an exact repositioning can be dispensed with for measuring the workpiece, in particular, for detecting the workpiece length. That is, this embodiment is especially characterized in that an exact positioning of the workpiece is unnecessary, which is especially of advantage in the case of bulky or heavy workpieces. Thus the supporting means must just be designed for a rough alignment of the workpiece.

In an advantageous development, a measuring head of the laser measuring means is disposed on a measuring carriage slidably supported on a guidance and drivable by a driving means in a direction parallel to the front surface of the workpiece. A path measuring device is provided for detecting the position of the measuring head during a laser scanning operation of the front surface of the workpiece. The measuring head is guided past the front surface of the workpiece. When the laser beam impinges on the material, there will be a first signal change. Like the subsequent signal changes, this signal change is evaluated by the measuring means and the control logic, respectively. Thus, during continued travel past the front side of the material the distance of the front surface of the material from a reference point is determined and the cross-sectional dimensions of the workpiece are detected.

The guidance is preferably swingable about an axis which is substantially in parallel with the intersection axis of a supporting surface and a bearing surface of the supporting means. Thus, in a first position of the guidance, the measuring carriage is drivable in parallel with a front surface diagonal of the workpiece supported on the supporting means, and, in a second position of the guidance, in parallel with the supporting surface of the supporting means. The first scanning operation along the front surface diagonal enables the control unit to make a distinction between round material and flat material. In case of a round material, the corners are not filled with material with respect to the supporting and bearing surfaces of the supporting means, in contrast to the case of the flat material. This means that, when the measuring head is guided by in the first position of the guidance, a first signal change will only take place at a certain distance from the intersection axis of the supporting surface and the bearing surface of the supporting means. This fact is exploited by the control unit to make a distinction between round material and flat material.

In the second position of the guidance in parallel with the supporting surface of the supporting means, the measuring carriage is guided with the laser measuring head past the front surface for determining the width and possibly the wall thickness of the workpiece. As regards hollow or profiled material, the measured values can be compared by the control unit with samples in a profiled material data base in the memory means, whereby the profile can be defined in an exact manner.

The control unit preferably includes an evaluating unit for linking measured path data of the path measuring device with laser beam measuring signals of the laser measuring means for determining the cross-sectional dimensions of the workpiece. As a result, changes in the signal level during scanning upon impingement of the laser measuring beam on the material can be localized in combination with measured path data of the path measuring device, whereby the cross sections of the workpieces can be recognized by the above-mentioned way.

In another advantageous embodiment of the invention, the sensor means includes a laser measuring means and a deflector device for deflecting a laser measuring beam for scanning the front surface of the workpiece. The laser measuring means need therefore not be arranged so as to be slidably supported on a guidance, but it is sufficient to arrange the laser measuring means in a stationary position, since the front surface of the workpiece is scanned by deflection of the laser measuring beam.

An advantageous development of the invention is that the second measuring means is provided with a tactile sensor disposed on a measuring carriage, which is supported slidably substantially in parallel with the intersection axis of the supporting surface and the bearing surface of the supporting means. A driving means is provided for driving the measuring carriage towards the front surface of the workpiece and a path measuring means is provided for detecting the position of the measuring carriage. The tactile sensor may for instance be a mechanical probe in combination with a switching element or a light barrier. The measuring carriage together with the tactile sensor arranged thereon is moved towards the second front surface of the workpiece to such an extent that a signal change will take place in the sensor upon impact on the second front surface. The position of the measuring carriage and thus the distance of the second front surface of the workpiece from a reference point can be detected by the path measuring means.

The driving means preferably includes a toothed belt drive to which an encoder is coupled for path measurement. As already explained above, the path is thus measured with a very high accuracy, as a result of which the length of the workpiece is also determined precisely.

An advantageous embodiment of the invention consists in that the second measuring means includes a laser measuring apparatus having a laser measuring head or an ultrasonic measuring apparatus having an ultrasonic measuring head disposed at a fixed distance from a reference point. This is of advantage for the reason that the device can be of a very simple and therefore of inexpensive type.

The second measuring means advantageously includes a guidance, on which the laser or ultrasonic measuring head is slidably supported for scanning the second front surface of the workpiece in a direction perpendicular to the intersection axis of the supporting surface and the bearing surface of the supporting means. During displacement of the measuring head a signal change takes place when the laser beam impinges on the second front surface of the workpiece, whereby the distance of the second front surface from a reference point is determined by the control unit.

However, scanning of the second front surface of the workpiece through the laser measuring beam can also be performed with a deflector device in a manner similar to that with the above-explained deflector device for the laser measuring means of the first measuring means.

Another preferred embodiment of the invention is that the supporting means is a conveyor means for cross-conveying the workpieces. The conveying means is provided with conveying chain belts with pushing bolts attached thereto. The conveying chain belts forms the supporting surface and the pushing bolts forms the bearing surface. This is of particular advantage, since the process for measuring workpieces is directly integrated into the conveying process of the rods between stock and processing machine. Hence, a separate conveying step for measuring the workpieces is unnecessary, so that storage and removal of rod shaped workpieces can be performed rapidly and economically.

In another advantageous embodiment of the invention, a first guidance, on which the measuring head is supported, is slidably supported on a second guidance. With this arrangement, in different positions of the first guidance on the second guidance, the measuring carriage is movable at different distances from a supporting surface of the supporting means. A first scanning operation along the supporting surface is performed at that predetermined distance from the supporting surface which permits a signal change in the measuring head independently of the dimensions of the workpiece. Independently of the cross section of the workpiece, the control unit can determine the central perpendicular of the front surface of the workpiece on the basis of the first and last signal changes that take place when the measuring head is guided by.

The measuring carriage can also be driven in a direction perpendicular to the supporting surface by displacing the first guidance along the second guidance. This makes it possible to detect the height of the workpiece in a second scanning operation, in particular along the previously determined central perpendicular. This dimension corresponds to the diameter in case of round material. Moreover, a comparison between the measured results of the first and second scanning operations permit the control unit to make a distinction between round material and flat material. If the distance of the measuring points at which the first and last signal changes take place during the first scanning operation is greater or equal to the height, this means a flat material, since flat material is always supported with its broad side on the supporting surface.

With complicated workpiece geometries, the measuring head is guided several times along the front surface of the workpiece at different distances in parallel with the supporting surface and in directions perpendicular thereto, so that the measured values can be compared by the control unit with samples in a profiled material data base in the memory means, whereby the profile can be defined in an exact manner.

The present invention shall now be explained in more detail with reference to embodiments and associated drawings, in which:

BRIEF DESCRIPTION OF DRAWINGS

FIG. 5 is a graphic representation illustrating the relationship between a signal level of a laser measuring beam of a laser measuring apparatus and the position of the laser measuring apparatus relative to a front surface of a workpiece for different workpiece cross-sections at two different swinging positions of the first measuring means according to the embodiment of FIG. 1;

FIG. 12 is a graphic representation illustrating the relationship between a signal level of a laser measuring beam of a laser measuring apparatus and the position of the laser measuring apparatus relative to a front surface of a workpiece for different workpiece cross-sections and different positions of the first guidance according to the embodiment of FIG. 9;

FIG. 20 is a graphic representation illustrating the relationship between a signal level of a laser measuring beam of a laser sensor and the position of the laser sensor relative to a front surface of a workpiece for different workpiece cross-sections and for two different positions of the laser sensor according to the embodiments of FIGS. 13 and 19;

DESCRIPTION OF THE PREFERRED EMBODIMENTS

Figure 1:
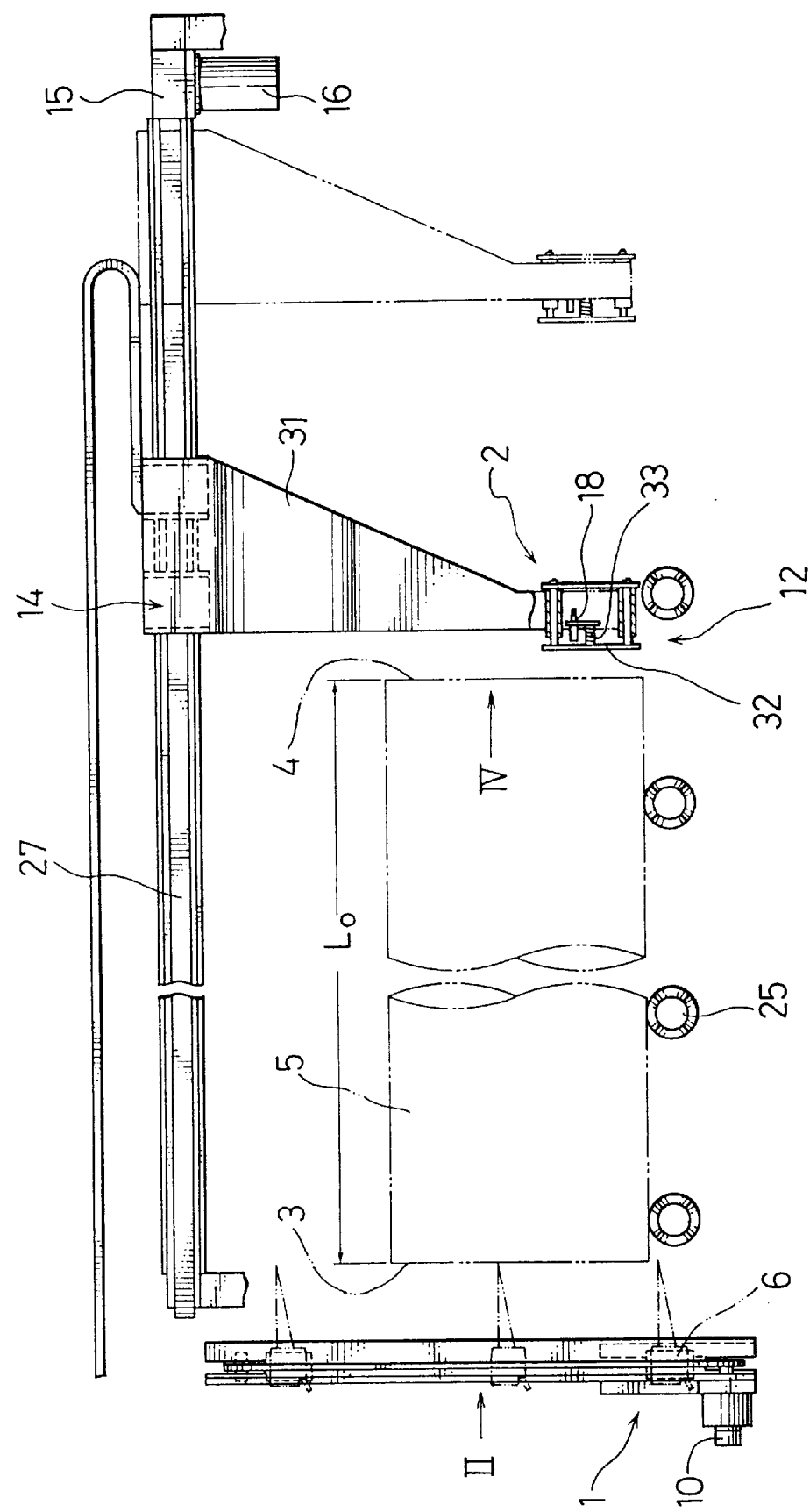
FIG. 1 is a front overall view of a device for measuring dimensions of workpieces according to a first embodiment of the invention.

FIG. 1 shows a first embodiment of a device for measuring sizes of workpieces. A supporting means 12 forms part of a cross conveying means (not shown in more detail). As becomes apparent from FIG. 4, the cross conveying means includes conveying chain belts 23 which are driven by a pinion 28 and a drive (not shown) and form a supporting surface 11 on which a workpiece 5 is supported. The conveying chain belts 23 have pushing bolts 25 which are attached thereto and form a bearing surface 26. On the surface 26, the workpieces 5 are roughly aligned during cross conveyance on the cross conveying means. The conveying chain belts 23 and the pushing bolts 25 are closely arranged for short workpieces, such as short rods or remaining rods, towards one side of the cross conveying means in the longitudinal direction of the workpiece and have an increasing distance to the other side of the cross conveying means.

The cross conveying means is part of a conveyor system by which workpieces, in particular rods, are conveyed from a storage place to a processing machine, in particular a saw. After having been processed, the workpieces are conveyed back to the storage place at least partly, i.e. the remaining pieces which were cut off.

At the sides of the supporting means 12, a first measuring means 1 and a second measuring means 2 are arranged outside of the supporting area. The first measuring means 1 is immovable relative to the longitudinal axis of workpiece 5 while the second measuring means 2 is arranged on a measuring carriage 14 which is displaceable on a measuring carriage guidance 27 substantially in parallel with the longitudinal axis of workpiece 5.

The first measuring means 1 and the second measuring means 2 detect the distance of a front surface (a first front surface) 3 and a rear surface (a second front surface) 4, respectively, of workpiece 5 from a reference point. The distances are processed in a control unit, whereby length LO of workpiece 5 is calculated. To detect the distance of the front surface 3 and of the rear surface 4 from a reference point, workpiece 5 need not be pushed against a fixed stop or the like, so that the workpiece 5 on the supporting means 12 can be in any desired position in the longitudinal direction and there is just a rough alignment on the pushing bolts 25.

Figure 2:
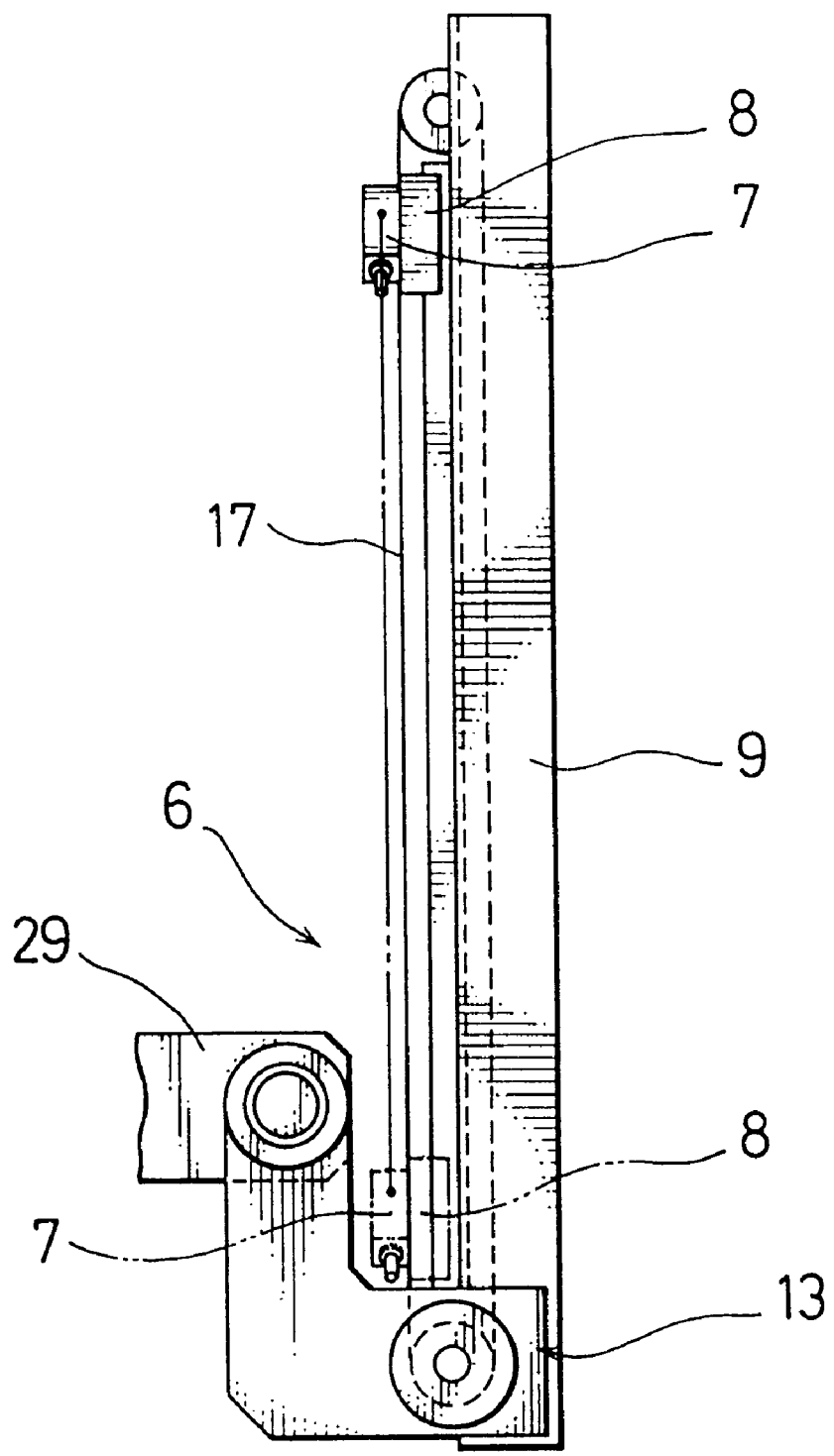
FIG. 2 is a lateral view of a portion of the first measuring means, indicated by an arrow II in FIG. 1.
Figure 3:
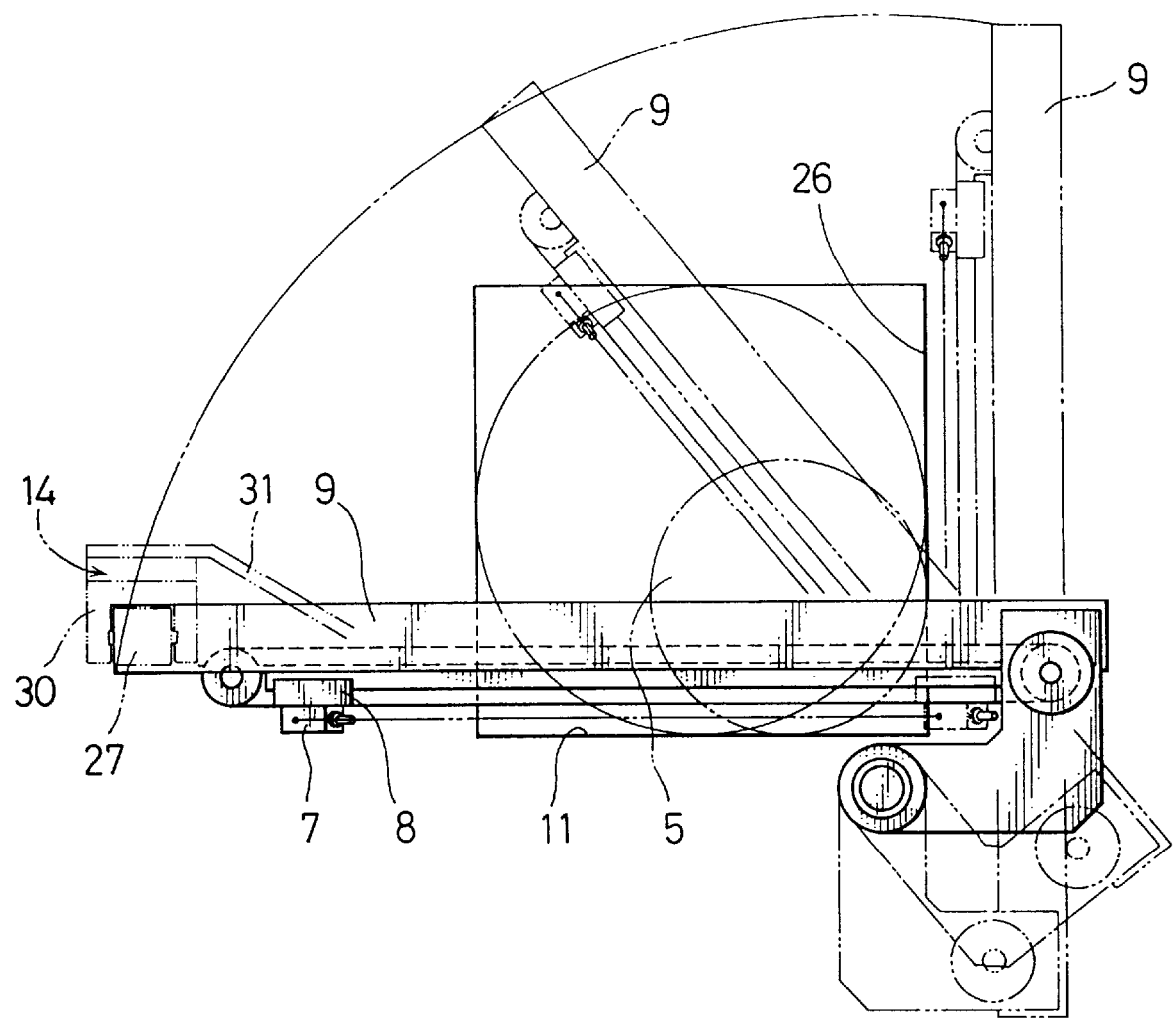
FIG. 3 is a lateral view of the portion of the first measuring means as shown in FIG. 2, in three differently swung positions.

The first measuring means 1 includes a sensor means 6 which is movably supported on a guidance 9 (FIG. 2). As shown in FIGS. 2 and 3, the sensor means 6 is arranged on a laser measuring means whose measuring head 7 is arranged on a measuring carriage 8 which is attached to a toothed belt drive 17. The measuring head 7 may include a conventional laser rangefinder. The toothed belt drive 17 is a part of a driving means 13 by which the measuring head 7 of the laser measuring means is moved along guidance 9. The guidance 9 is substantially arranged at a right angle relative to the alignment of the pushing bolts 25 of supporting means 12 (i.e. at a right angle relative to the longitudinal direction of the workpiece). Thus measuring head 7 of the laser measuring means is movable in parallel with the front surface 3 of workpiece 5. To detect the distance of front surface 3 from the reference point, the measuring head 7 is guided past the front surface 3 in such a manner that upon impingement of a laser measuring beam on workpiece 5 there will be a signal change which will be evaluated by the control unit. During travel of the measuring head 7 past the front surface 3 of workpiece 5, the distance of the front surface 3 from the reference point is determined by the control unit.

An important aspect of the present invention is the possibility of detecting the cross-sectional dimensions of workpiece 5. To this end, guidance 9, along which the measuring carriage 8 is movable with the measuring head 7 attached thereto, is rotatably supported on a frame 29 of the device. The guidance 9 is swingable about an axis which is substantially in parallel with the intersection axis of the supporting surface 11 formed by the chain belts 23 and the bearing surface 26 which is defined by the pushing bolts 25 (FIG. 3). That is, it is swingable in such a manner that the measuring head 7 is movable in a first angular position of the swingable guidance 9 along a front surface diagonal of workpiece 5, which rests on the supporting means 12. In particular, it is substantially movable at a 45° angle relative to the supporting surface 11, as is apparent from FIG. 3. During displacement of the measuring head 7 along the guidance 9 the laser measuring beam sweeps over the corner portion between the supporting surface 11 and the bearing surface 26 in this angular position of guidance 9, whereby the control unit can make a distinction between round and flat materials in the workpiece in accordance with an evaluating logic stored in the memory means, as shown in FIG. 5. In contrast to flat material, the corner portions are not filled with material in the case of a round material at the corner portion between the supporting surface 11 and the bearing surface 26.

To see at which point a workpiece contour is present where upon impingement of the laser measuring beam on the workpiece a first or last signal change will take place, or in a more general manner a change in the signal level, the driving means 13 which effects the displacement of the measuring carriage 8 with the measuring head 7 attached thereto is provided with a path measuring means 10 (FIG. 1). The path measuring means 10 includes an encoder coupled to the toothed belt drive 17 for numerical path measurement. Thus in the control unit the measured path data which are detected by the path measuring means 10 can be linked with the laser beam measuring signals of the laser measuring means for determining the cross-sectional dimensions of workpiece 6.

As shown in FIG. 5, a path "a" between the surface of the workpiece and the intersection axis of the supporting surface 11 and the bearing surface 26, in which no signal change takes place in the measuring head 7, is an indicator on the basis of which the evaluating logic of the control unit can recognize whether workpiece 5 is a round or flat material. If workpiece 5 is a round material, the length of path "a" is greater than zero. By contrast with a flat material, the first signal change takes place directly, or in accordance with an admissible material curvature slightly above the supporting surface 11. The path measuring means 10 thus senses a path "a" which is approximately zero. The path of displacement L is sensed by the path measuring means 10 when the next signal change takes place. The path L yields the material height H upon conversion of the corresponding angular position which, as already stated, is about 45° relative to the supporting surface 11. In the case of a hollow material, the wall thickness "t" is also measured.

In case workpiece 5 is a flat material, guidance 9 is swung for determining the workpiece width W into a second angular position which is in parallel with the supporting surface 11. In this angular position, the measuring head 7 of the laser measuring means can be displaced in parallel with the supporting surface 11. The distance of displacement of the measuring carriage 8 where a signal change takes place in measuring head 7 is sensed by the path measuring means 10 and by the control unit, as a workpiece width W.

Likewise, it is possible to swing guidance 9 into a third angular position substantially in parallel with the bearing surface 26 so as to measure the workpiece height H in a corresponding manner directly or to check the calculation on the basis of the measured data which were obtained in a first position of guidance 9 during displacement of measuring carriage 8.

When workpiece 5 is a hollow and profiled material, the laser beam measuring signals are compared by the control unit, in combination with the measured path data, with pattern data stored in the memory means in the form of a profiled material data base. The respective profile of workpiece 5 can thereby be defined in an exact manner.

If workpiece 5 is a round material, it is normally sufficient to guide the measuring head 7 once past the front surface 3 in the first position of guidance 9 in parallel with a front surface diagonal. Due to specific circumstances, such as an excessively curved workpiece 5 or an incorrect support of workpiece 5 on the supporting surface 11 or an insufficient alignment of workpiece 5 on supporting surface 26, the control unit may erroneously assume the presence of flat material. However this erroneous assumption induces a further measurement of the workpiece width W by displacing measuring carriage 8 in the second position of guidance 9 in parallel with supporting surface 11, and this further measurement will possibly lead to a correction.

Figure 4:
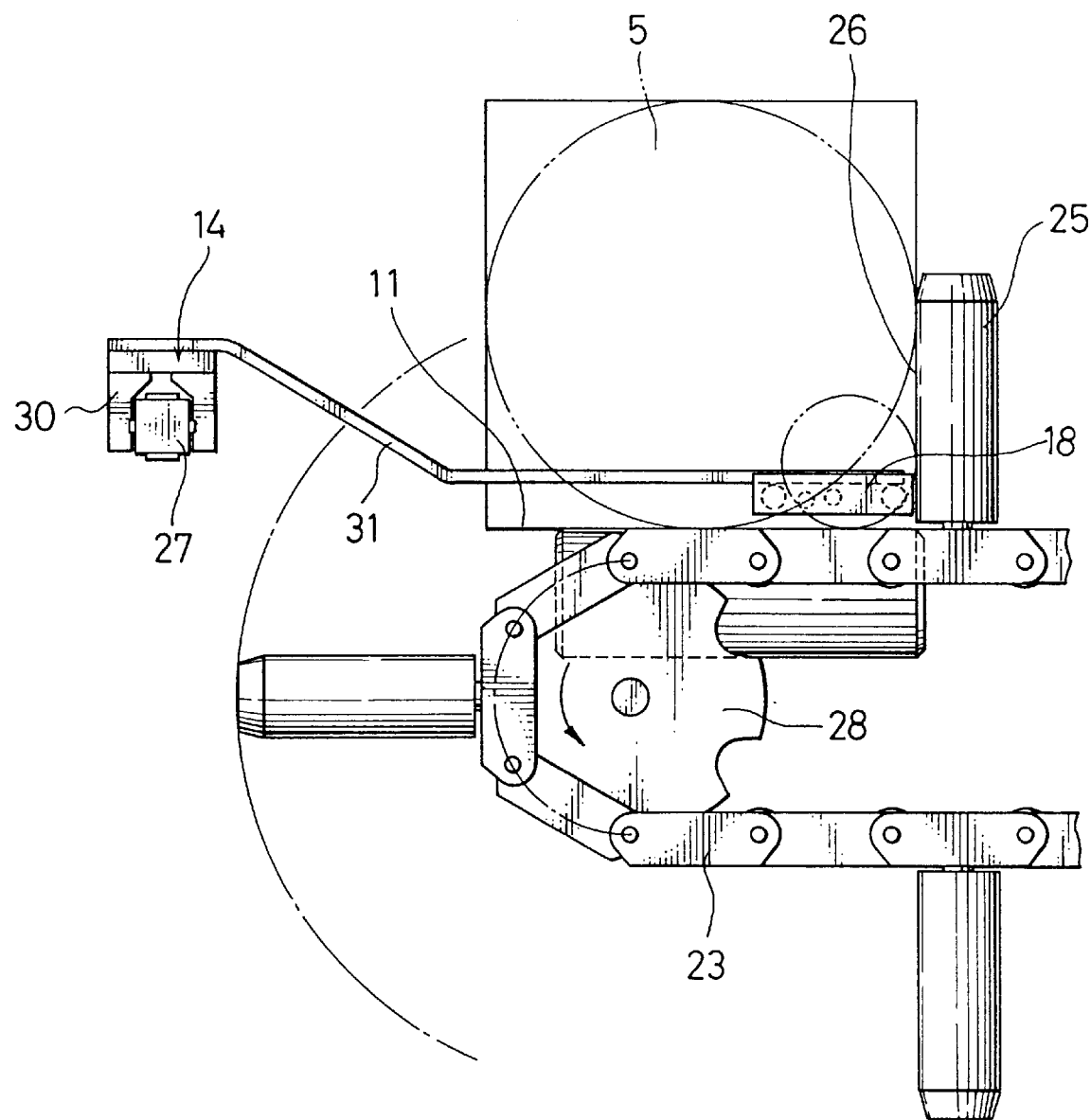
FIG. 4 is a detailed view of a conveying means indicated by an arrow IV in FIG. 1, the conveying means including a chain belt and pushing bolts, and a workpiece resting on the chain belt in contact with a pushing bolt.

The second measuring means 2 which is arranged at the side opposite to the first measuring means 1 includes a tactile sensor 18, as can be seen in FIG. 1, which is disposed on a measuring carriage 14. As shown in FIG. 4, measuring carriage 14 includes a slide 30 which is movably supported on measuring carriage guidance 27, as well as an arm 31 which is rigidly secured with its one end to slide 30. The other end of the arm 31 has the tactile sensor 18 disposed thereon. The measuring carriage guidance 27 extends in parallel with the intersection axis of the supporting surface 11 and the bearing surface 26, so that the measuring carriage 14 of the second measuring means 2 is movable in parallel with the longitudinal axis of workpiece 5 which rests on the supporting means 12. A driving means 15 is provided for displacing measuring carriage 14, the respective position of measuring carriage 14 being sensed by a path measuring means 16. The driving means 15 includes a toothed belt drive which has an encoder coupled thereto for direct path measurement. Thus the measuring carriage 14 can be moved exactly and its respective position can be detected accurately.

To detect the distance of the rear surface 4 from a reference point, which is used by the control unit for calculating length L0 of workpiece 5 together with the distance of the front surface 3 from the reference point, the measuring carriage 14 is moved along the measuring carriage guidance 27 toward the rear surface 4 of workpiece 5 until tactile sensor 18 will supply a signal upon impact on the rear surface 4. The reference points for the first and second measuring means 1, 2 may be the same, or may be different from each other.

To enable the tactile sensor 18 to hit on the rear surface 4 of workpiece 5 in the case of different workpiece sizes and different workpiece positions on the supporting means 12, a contact plate 32 which is movably supported on arm 31 of measuring carriage 14 is provided on the arm 31 between the tactile sensor 18 and the area in which workpiece 5 is supported. Thus upon impact on the front surface 4 of workpiece 5 the contact plate 32 is pushed onto the tactile sensor 18 attached to the arm 31, so that tactile sensor 18 will supply a signal. A spring element 33 which biases the contact plate 32 into a position in which the tactile sensor 18 does not provide a signal is disposed between contact plate 32 and arm 31. Spring element 33 biases contact plate 32 with a very slight force, so that upon impact of contact plate 32 on the rear surface 4 of workpiece 5, workpiece 5 will not be displaced.

In this embodiment tactile sensor 18 is designed as a mechanical probe in combination with a switching element, but a light barrier or the like may also be used.

An advantage of this embodiment of the invention is the very large measuring range. For instance, rod lengths from 400 mm to 1,000 mm can be detected.

Figure 6:
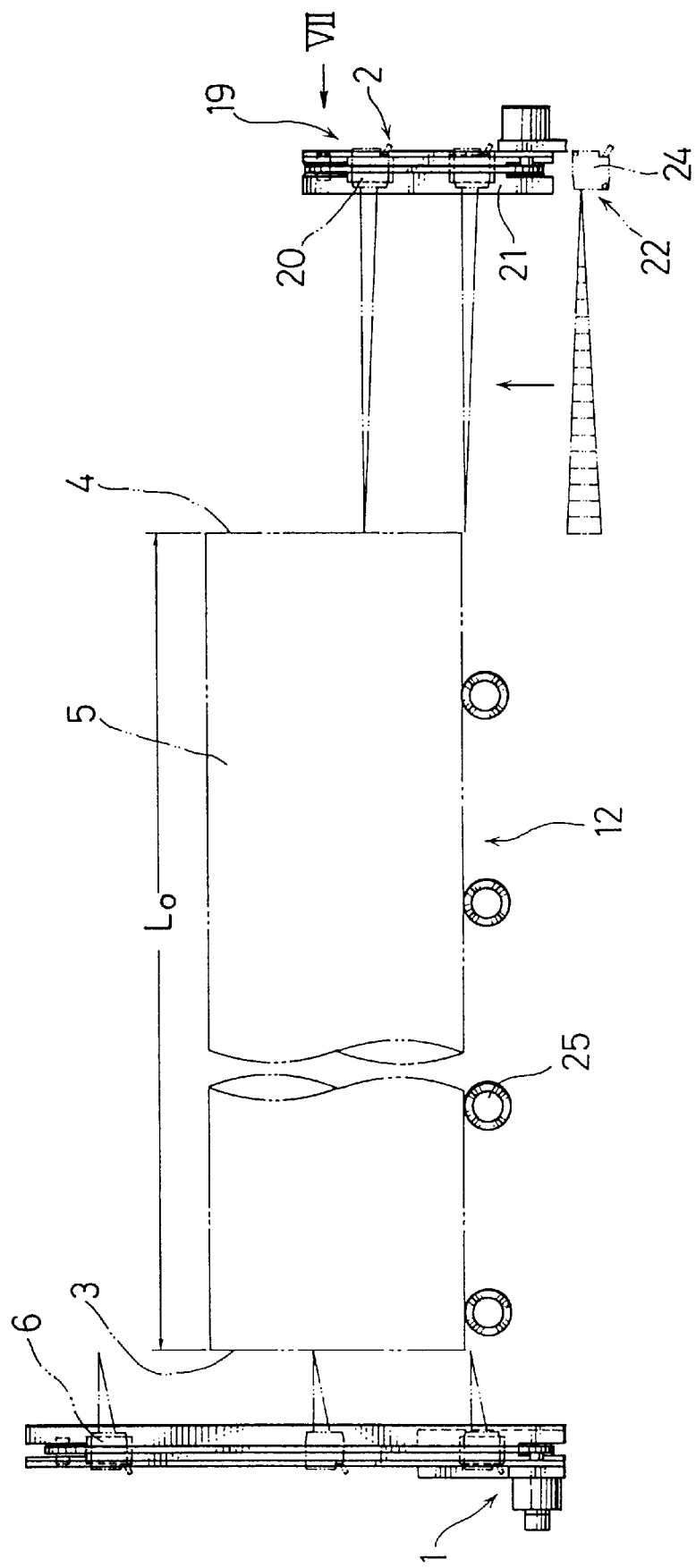
FIG. 6 is a partial top view of a device for measuring dimensions of workpieces according to a second embodiment of the invention, with a second measuring means alternatively including a laser measuring apparatus or an ultrasonic measuring apparatus.
Figure 7:
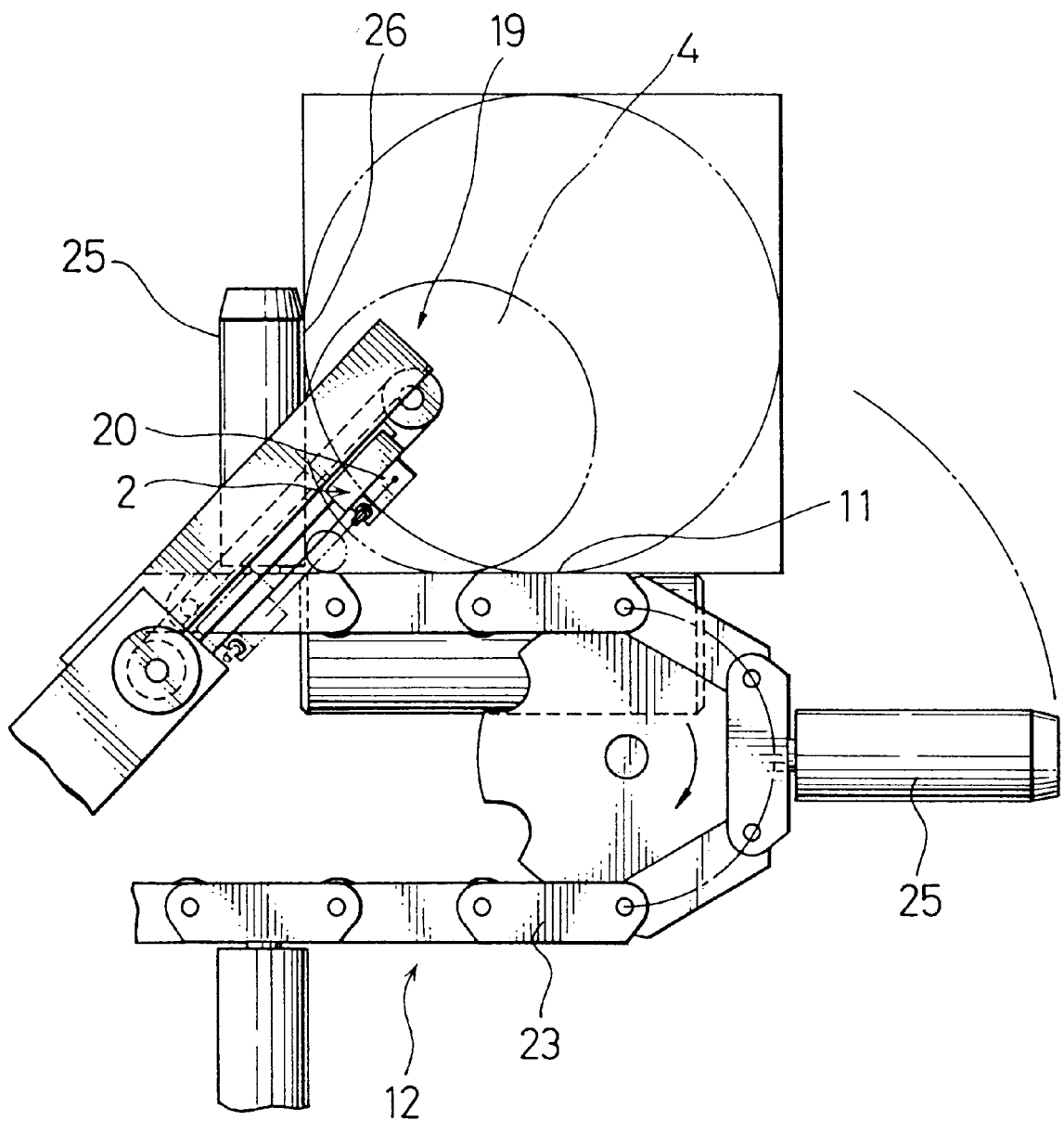
FIG. 7 is a lateral view of a portion of the second embodiment, indicated by an arrow VII in FIG. 6, a conveying means having a chain belt and pushing bolts, and a workpiece being supported on the chain belt in contact with a pushing bolt.
Figure 8:
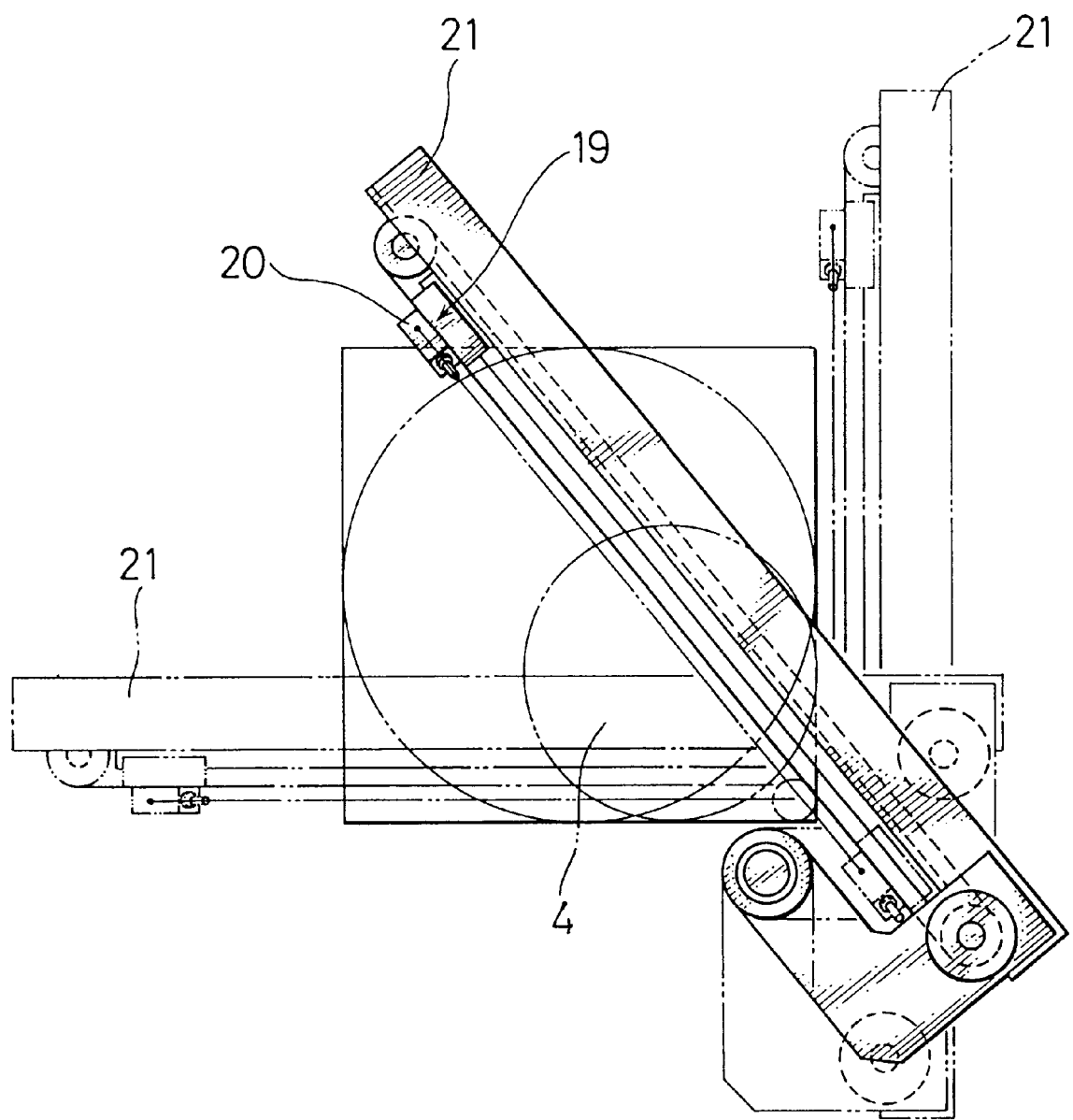
FIG. 8 is a lateral view of a second measuring means in different swinging positions according to the embodiment of FIG. 7, the measuring means being shown in a first position in parallel with a supporting surface, in a second position in parallel with a front surface diagonal of the workpiece, and in a third position in parallel with a bearing surface.

FIGS. 6, 7, and 8 show a second embodiment of the present invention, in which essential parts of the first embodiment are similar. The structural members which resemble the first embodiment are provided with the same reference numerals.

For instance, the device according to the second embodiment includes a supporting means 12, which forms part of a cross conveying means, having conveying chain belts 23 which form a supporting surface 11, and pushing bolts 25 which form a bearing surface 26. First and second measuring means 1 and 2 are provided at both sides of the supporting means 12 outside the supporting area in which workpiece 5 rests. The first measuring means 1 corresponds to the first measuring means of the above-described first embodiment, and serves to measure the distance of the front surface 3 of workpiece 5 from a reference point and to detect the cross-sectional dimensions of workpiece 5.

The second measuring means 2 includes a laser measuring device 19 having a laser measuring head 20 arranged at a fixed distance from a reference point. Like the laser measuring means of the first measuring means 1, the laser measuring head 20 of the second measuring means 2 is movably arranged on a guidance 21 which is aligned at a right angle relative to the bearing surface 26 which is defined by the pushing bolts 25. Thus the laser measuring head 20 of the laser measuring apparatus 19 is movable in parallel with the rear surface 4 of workpiece 5.

As can be seen in FIG. 7, when the laser measuring head 20 of the second measuring means 2 is guided past the rear surface 4 of workpiece 5 in a direction perpendicular to the longitudinal axis of workpiece 5, a signal change takes place in the laser measuring apparatus 19 due to reflection of the laser measuring beam by the workpiece 5, whereby the distance of the rear surface 4 from the reference point is detected.

Instead of the laser measuring apparatus 19, an ultrasonic measuring apparatus (Sonarbero) can be used with an ultrasonic measuring head 24.

An shown in FIG. 8, guidance 21 is swingable about an axis which is substantially in parallel with the intersection axis of the bearing surface 26 with the supporting surface 11 of the supporting means 12. Thus the rear surface 4 of workpiece 5 can be scanned in different positions like with the first measuring means 1, and the cross-sectional dimensions of workpiece 5 can be detected by the second measuring means 2. With respect to the detection of the cross-sectional dimensions of workpiece 5, the result which is determined by the first measuring means 1 on the basis of the measured data can be checked and a mean value can be formed between the results determined on the basis of the measured data by the first and second measuring means.

In accordance with another preferred embodiment, the first measuring means 1 and/or the second measuring means 2 includes a laser measuring means whose measuring heads are fixedly arranged relative to respective supporting means. A deflector device for deflecting the laser measuring beam is provided for scanning the front surface 3 or the rear surface 4 of workpiece 5. Thus the front surface is scanned and the contour imaged, and the cross-sectional dimensions of workpiece 5 are determined therefrom, and the distance of the front surfaces 3 and 4 from a reference point can be measured. The deflector device for deflecting the laser measuring beam may, for instance, includes controlled mirrors.

The length of the workpieces can be detected by the device of the invention for measuring rod shaped workpieces without the workpieces having to be aligned in an exact manner and brought into a defined position in contact with a stop. Moreover, an advantage of the invention is that apart from the length of the rods the cross-sectional dimensions of the rod can also be determined, so that storage of the workpieces and supply of a processing machine with the stored workpieces can be controlled independently by a control unit.

Figure 9:
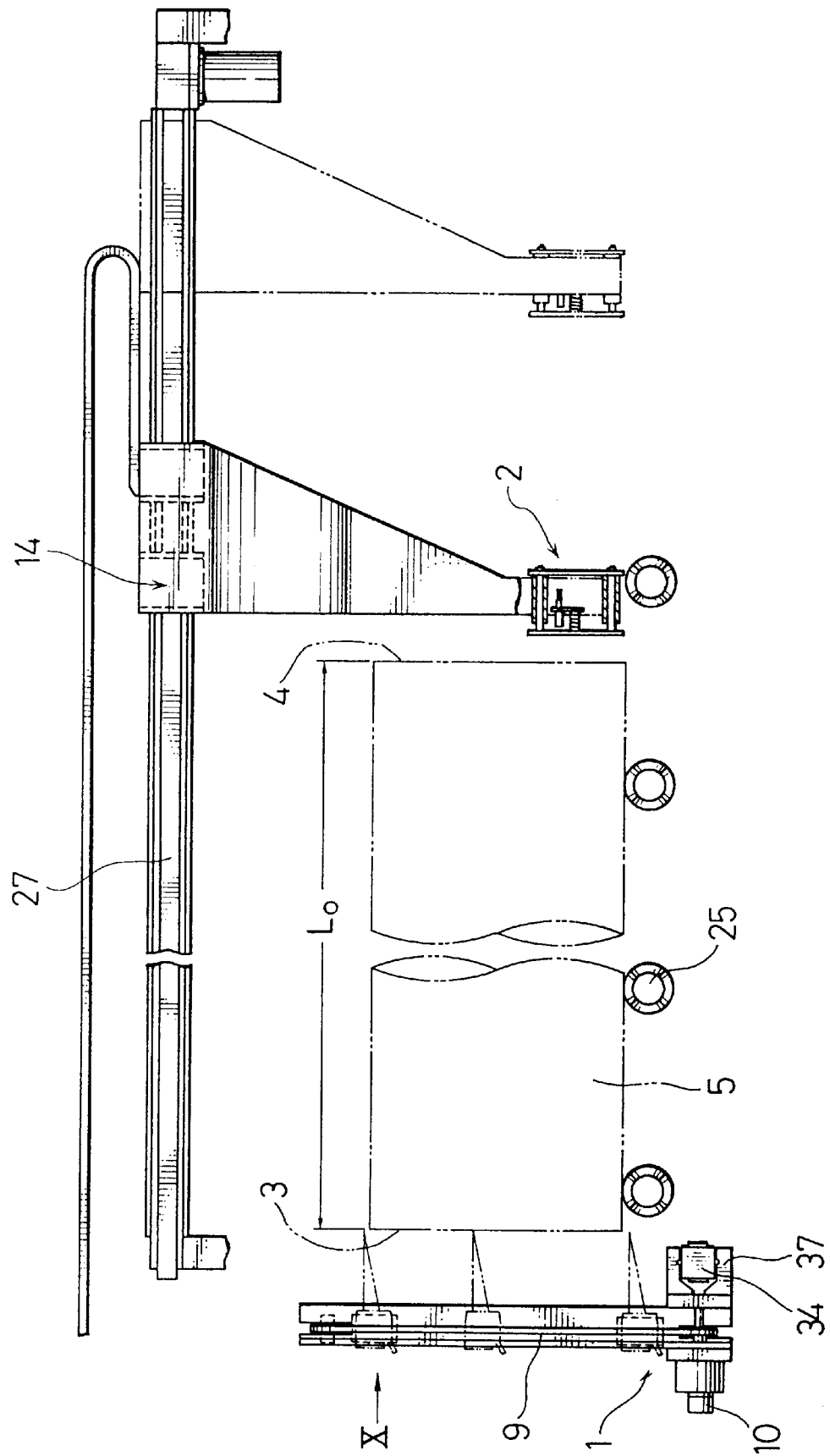
FIG. 9 is a top overall view of a device for measuring dimensions of workpieces according to a third embodiment of the invention.
Figure 10:
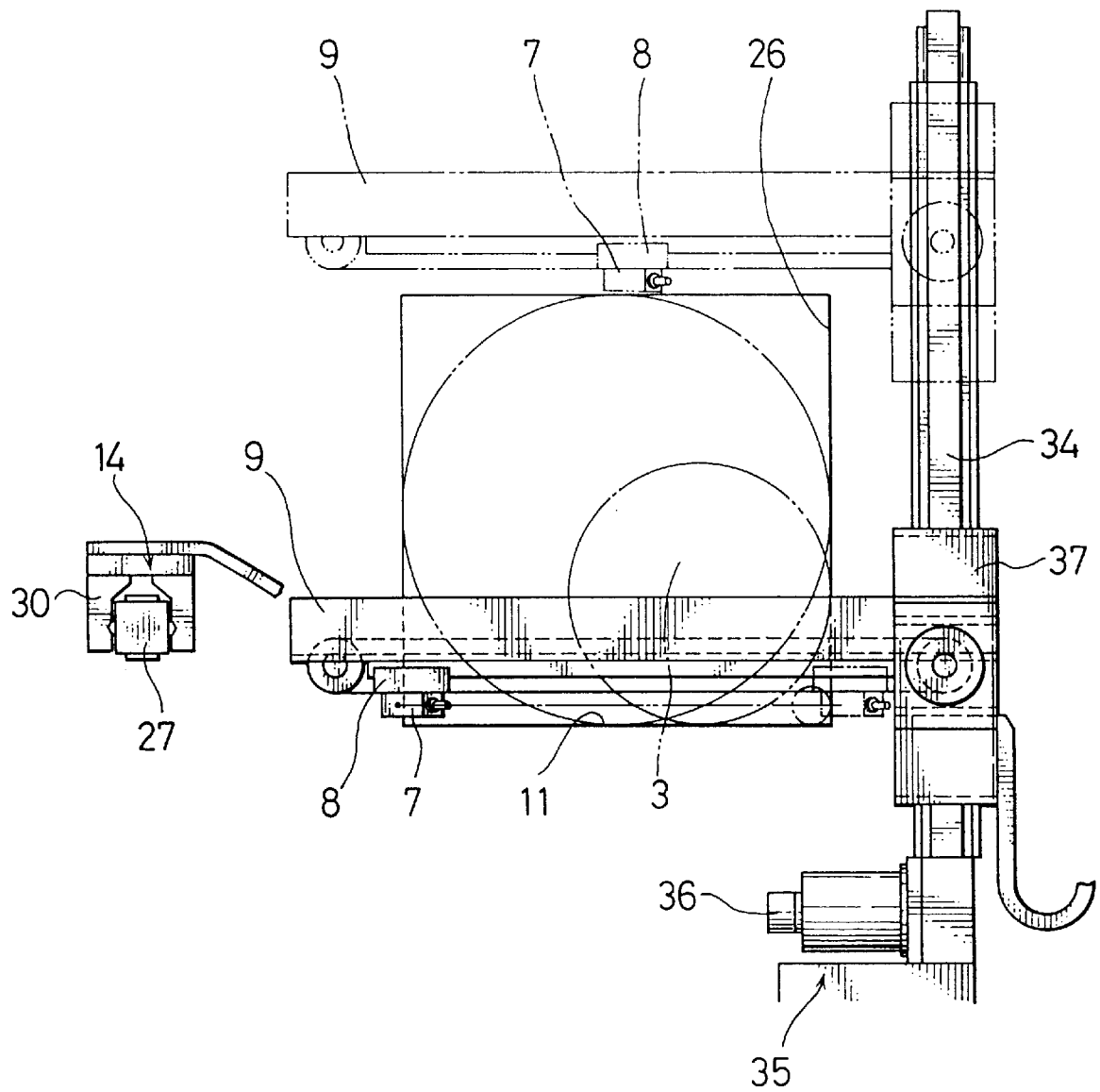
FIG. 10 is a lateral view of a portion of first measuring means, indicated by arrow X in FIG. 9, the measuring means including an associated sensor means and first and second guidances.
Figure 11:
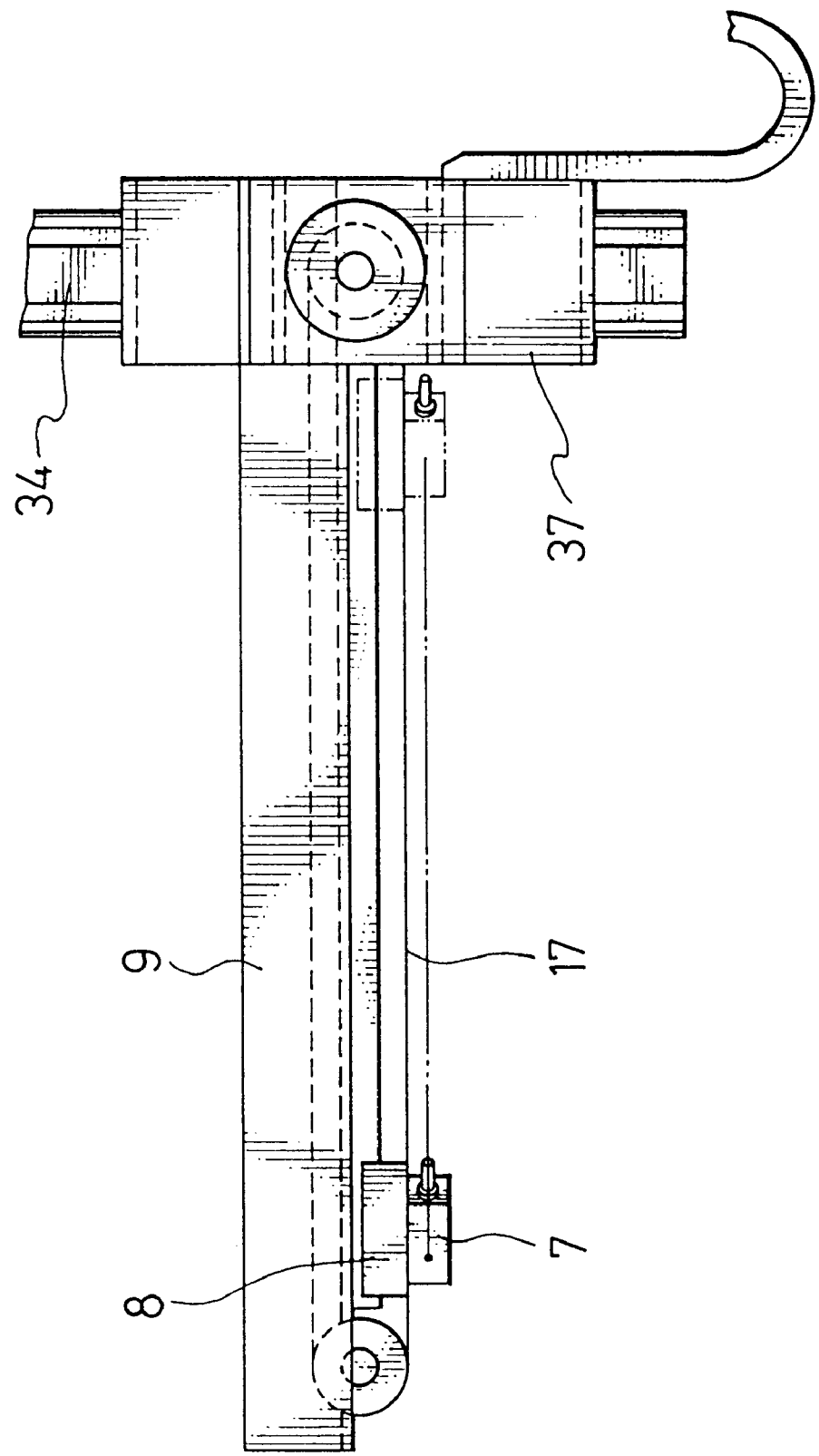
FIG. 11 is an enlarged lateral view of the first and second guidances shown in FIG. 10.

FIGS. 9, 10, and 11 show a third embodiment of the present invention in which essential parts are similar to the first embodiment and therefore provided with identical reference numerals.

The device according to the third embodiment has a second guidance 34 along which the first guidance 9 is slidably supported and movable. The second guidance 34 is substantially a square profile with guidance projections and grooves formed thereon, and a U-shaped slide 37, which is rigidly connected to the first guidance 9, surrounds the second guidance 34 and is slidably supported thereon.

As becomes apparent from FIG. 10, the measuring head 7 can thereby be guided past the front surface 3 of workpiece 5 substantially horizontally at different distance from the supporting surface 11 according to different vertical positions of the first guidance 9. On the other hand, the measuring head 7 can be guided past the front surface 3 in a direction perpendicular to the supporting surface 11 and in parallel with the bearing surface 26 by displacing the first guidance along the second guidance 34.

To detect the cross-sectional dimensions of workpiece 5, measuring head 7 is moved in a first position along the first guidance 9 which is located at a small distance from the supporting surface 11, so that the laser measuring beam sweeps over the front surface 3 of workpiece 5 substantially horizontally. The first path measuring means 10 exactly detects at which point there is a workpiece contour at which a first or last signal change or, in a general manner, a change in the signal level will take place upon impingement of the laser measuring beam on workpiece 5. The control unit links the measured path data, which are determined by the first path measuring means 10, with the laser beam measuring signals of the laser measuring means 7, thereby determining the center between the measuring point of the first and last signal changes, which corresponds to a center perpendicular.

For a second scanning operation the measuring head 7 is positioned in the previously determined center, so that a laser measuring beam is guided over the front surface 3 of workpiece 5 along the center perpendicular by displacing the first guidance 9 along the second guidance 34.

To detect, during the second scanning operation, positions at which there is a workpiece contour and at which there will be a first or last signal change upon impingement of the laser measuring beam on the workpiece, a second driving means 35 for effecting the displacement of the first guidance 9 along the second guidance 34 is provided with a second path measuring means 36. The path of displacement of the first guidance 9, which is determined thereby, corresponds to the height of workpiece 5 which, as far as round material is concerned, is diameter D at the same time.

Figure 12:
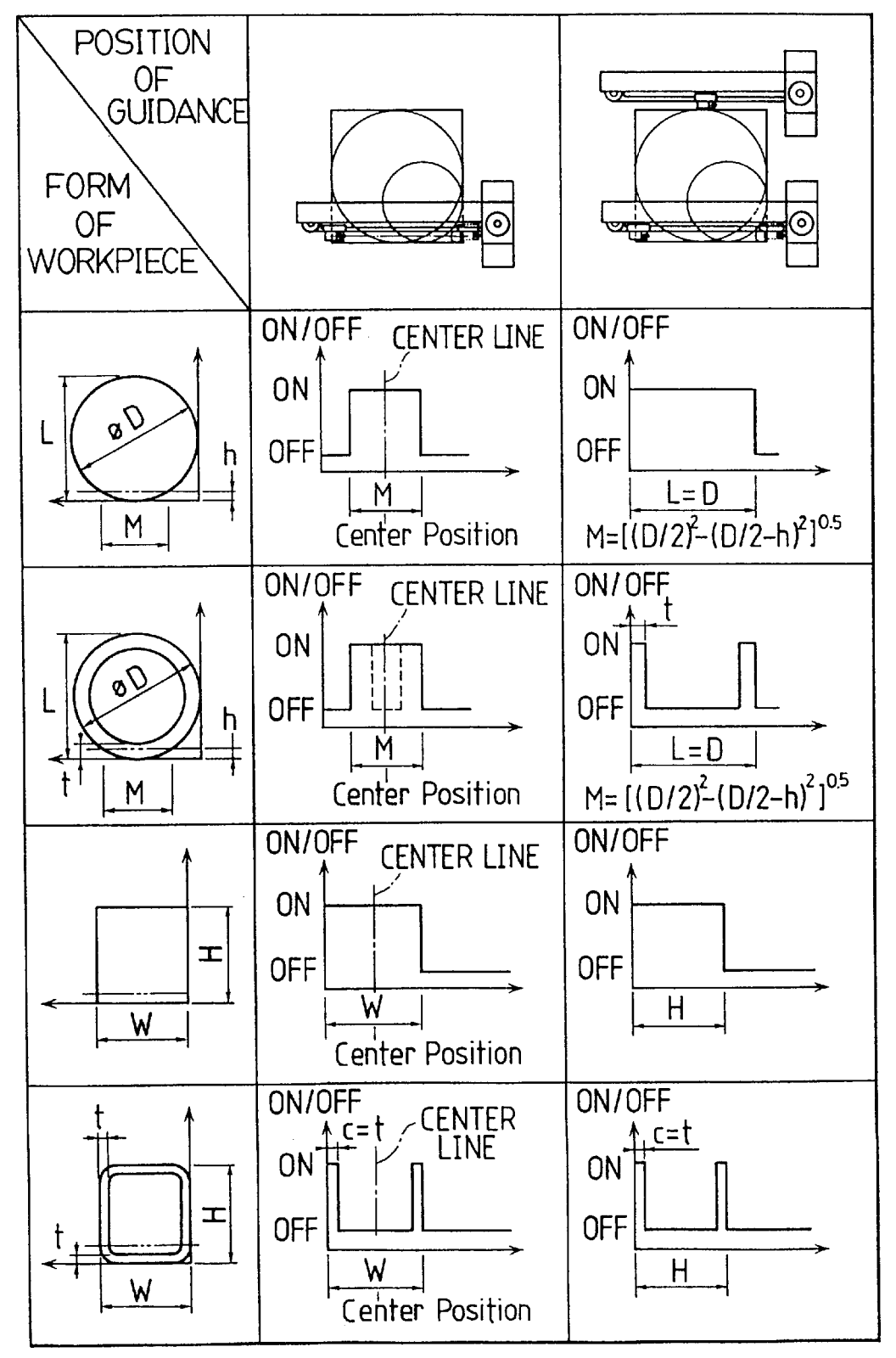

As shown in FIG. 12, a distinction can be made between flat material and round material by comparing the determined height H with the distance M, W of the measuring points at which the first and last signal changes take place during the first scanning operation in parallel with the supporting surface 11. If the distance M, W of the measuring points of the first and last signal changes during the first scanning operations is greater than or equal to height H, a flat material is present since flat material will always rest with the broad side on the supporting surface 11.

For increasing the measuring accuracy, in a third scanning operation the guidance 9 is positioned at half the height (½) H from the supporting surface 11 so that measuring head 7 can be moved at that height in parallel with the supporting surface 11. With a flat material, it is thus possible to eliminate any inaccuracy of the width measurement during the first scanning operation that is possibly caused by the rounded edges of workpiece 5. With a round material, it is possible to determine the diameter D with an increased accuracy through a mean value between height H and the width W which is sensed at half the height (½) H during the third scanning operation.

In case workpiece 5 has a complicated and irregular geometry, it is possible to obtain, through a multitude of scanning operations in parallel with the supporting surface 11 and in parallel with the contact surface 26, a plurality of measuring data which permit an exact determination of the respective profile of workpiece 5 through a comparison with model data which are stored in the storing means in the form of a profiled material data base.

Figure 13:
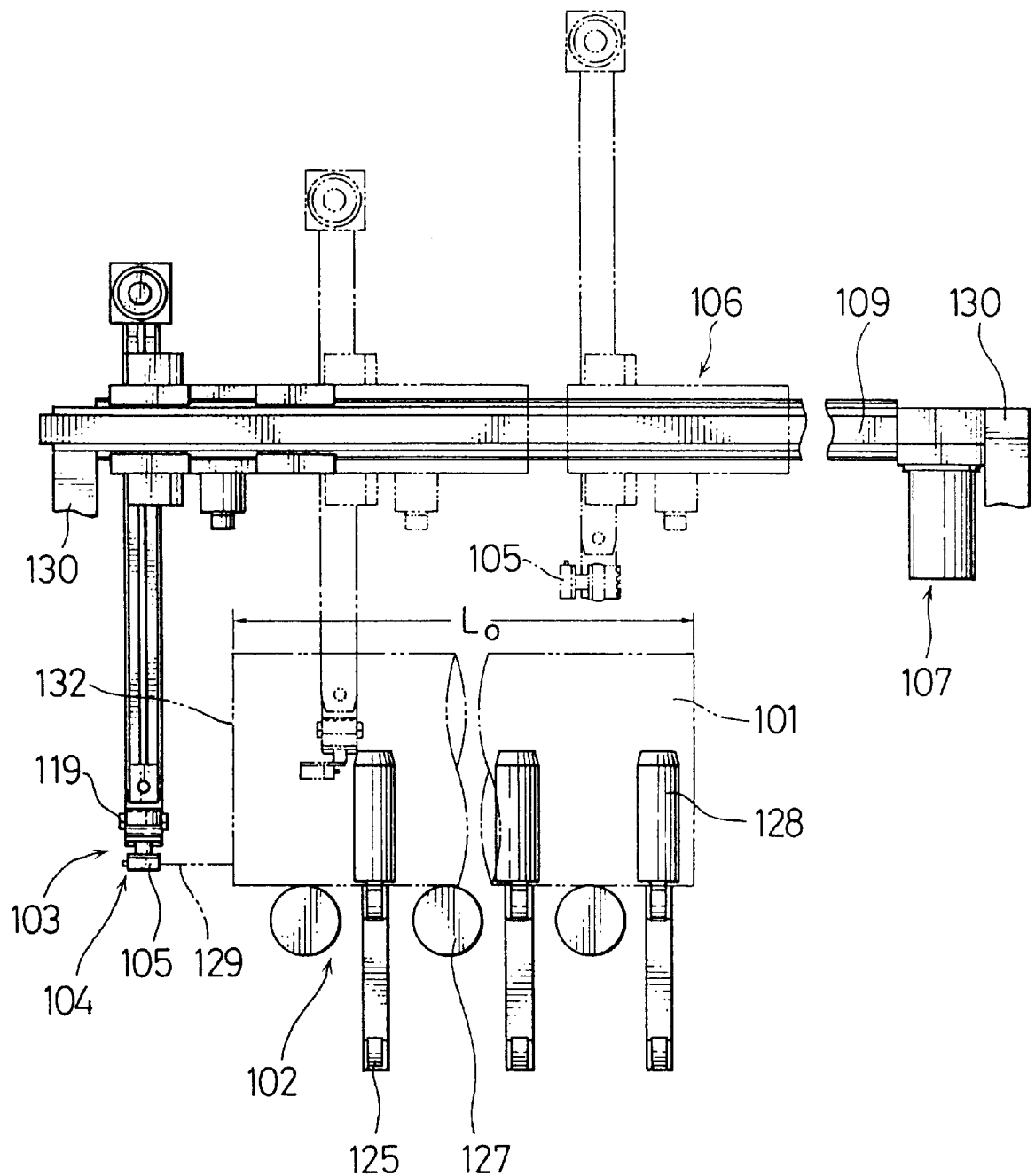
FIG. 13 is a front overall view of a device for measuring workpieces according to a fourth embodiment of the invention.

FIG. 13 shows a fourth embodiment of a device for measuring dimensions of workpieces. A workpiece 101 is disposed on a supporting means 102 which forms part of a cross conveying means (not shown in more detail). As becomes apparent from FIG. 14, the cross conveying means includes conveying chain belts 125 which are driven by a pinion 126 and a drive (not shown). The conveying chain belts 125 form, together with supporting bolts 127, a supporting surface on which workpiece 101 is supported. The conveying chain belts 125 have pushing bolts 128 attached thereto, which form a bearing surface on which workpiece 101 is roughly aligned during cross conveyance on the cross conveying means. The conveying chain belts 125 and the pushing bolts 128 are closely arranged for short workpieces, such as short rods or remaining rods, preferably towards one side of the cross conveying means in the longitudinal direction of the workpiece, and have an increasing distance from one another towards the opposite end of the cross conveying means.

The cross conveying means is part of a conveyor system by which workpieces, in particular rods, are conveyed from a storage place to a processing machine and, after having been processed, for instance by a saw, are conveyed back to the storage place at least partly, i.e. as the remaining pieces which were cut off by the saw.

To detect the geometry of the workpiece, there is provided a measuring means which is generally designated by reference numeral 103. The measuring means 103 includes a sensor means 104 which is movable relative to the workpiece 101 resting on the supporting means 102 so as to scan the surfaces of workpiece 101. In the embodiment the sensor means 104 is formed by a laser sensor which includes a measuring head 105 that emits a laser beam 129 and scans the workpiece surfaces therewith.

The measuring head 105 is movably supported on a guiding device which is generally designated by reference numeral 106. The guiding device 106 has a longitudinal guidance 109 which spans the supporting means 102 in the longitudinal direction thereof, i.e. in the longitudinal direction of workpiece 101 and is fixedly attached to supporting props 130 which, in turn, are anchored at both sides of the supporting means 102 in a suitable manner.

Figure 14:
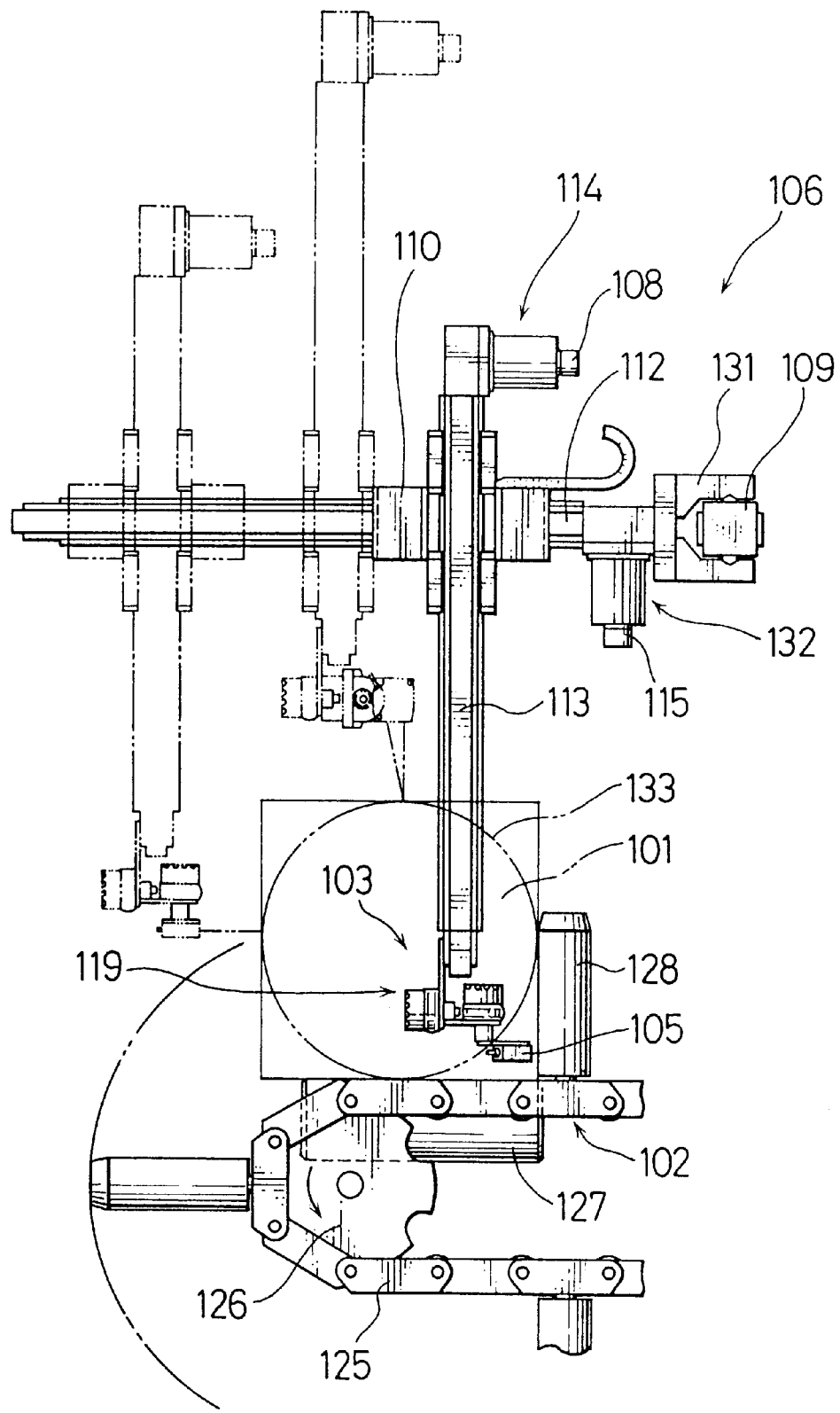
FIG. 14 is a lateral view of the device including a sensor means which is disposed on a guiding device shown in different positions, in accordance with the embodiment of the invention according to FIG. 13.

As shown in FIG. 14, guiding device 106 further includes two linear guidances 112, 114 which are displaceably supported on the longitudinal guidance 109 and connected to each other via a cross slide 110. A first one of the two linear guidances, which is designated by reference numeral 112, has a guiding slide 131 fixedly attached thereto, and movably supported on the longitudinal guidance 109. The guiding slide 131 is formed by a substantially rectangular profile and consequently movably guides the first linear guidance 112 along longitudinal guidance 109.

As becomes apparent from FIG. 13, the first linear guidance 112 is movable by a driving means 107 along the longitudinal guidance 109. The driving means 107 includes a toothed belt drive and an encoder coupled to the toothed belt for exactly detecting the position of the linear guidance 112 relative to the longitudinal guidance 109.

As becomes apparent from FIG. 14, cross slide 110 is supported on the first linear guidance 112 for moving along the first linear guidance 112 in a direction transverse to the longitudinal direction of workpiece 101. A driving means 132 is connected via a toothed belt drive to cross slide 110 to move the same in accordance with a control signal. An encoder 115 is coupled to driving means 132 to sense the exact position of cross slide 110 relative to the first linear guidance 112.

In a direction perpendicular to the longitudinal direction of the first linear guidance 112, the cross slide 110 slidably guides a second linear guidance 113 which is thus displaceable both horizontal, i.e. together with cross slide 110 along the first linear guidance 112, and vertically. For vertical displacement of the second linear guidance 113, another driving means 114 is provided which includes a toothed belt drive and an encoder 108 coupled thereto for detecting the exact position of the second linear guidance 113 relative to cross slide 110.

Apart from the horizontal and vertical movability in a plane perpendicular to the longitudinal direction of the supporting means 102, i.e. the longitudinal axis of the rod shaped workpiece 101, the second linear guidance 113 is also displaceable due to the movable support of the first linear guidance 112 in parallel with the longitudinal axis of workpiece 101, which axis is perpendicular to the plane of drawing in FIG. 14. Therefore the measuring head 105 of laser sensor 104 which is arranged on the lower end of the second linear guidance 113 is movable along any three-dimensional curve, especially along straight lines oriented in any direction, and is guidable along the surfaces of workpiece 101.

Figure 18:
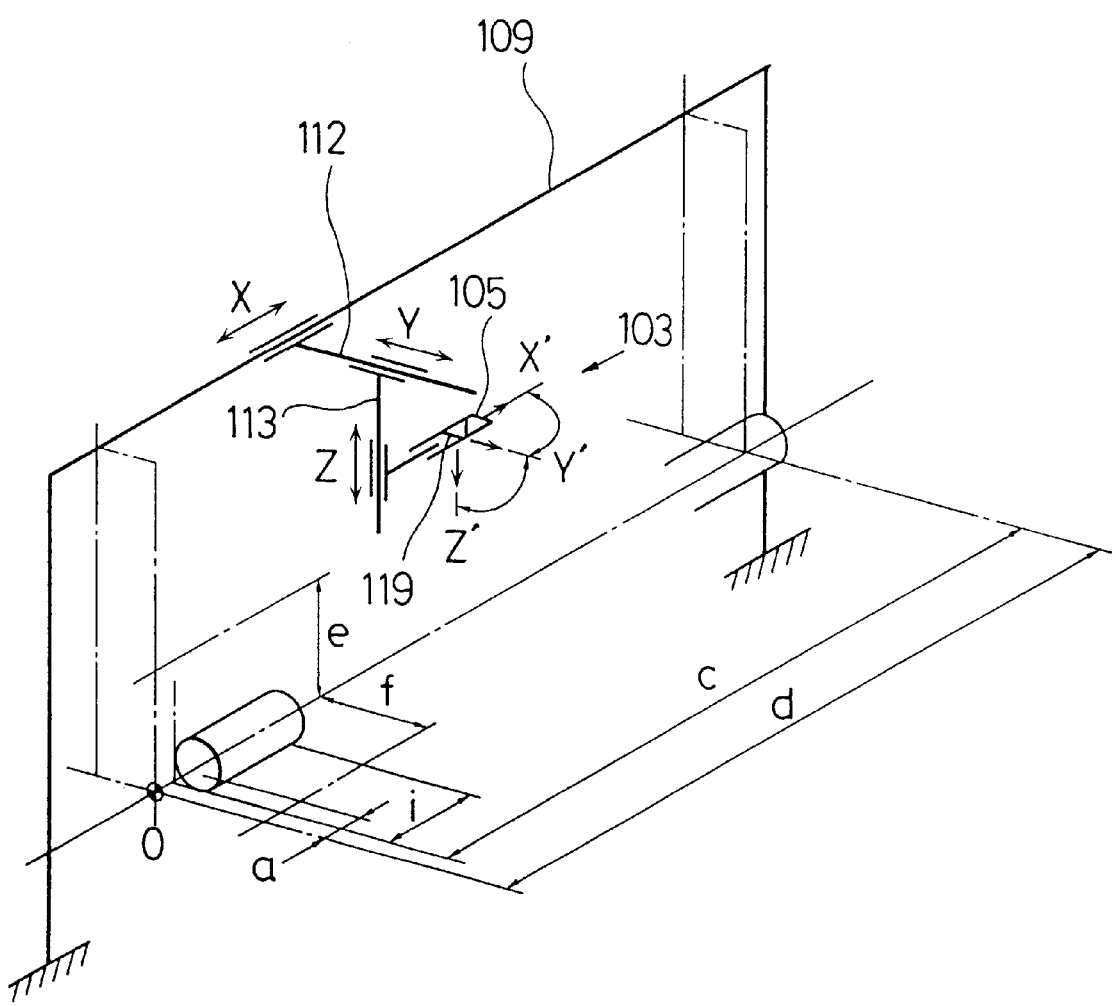
FIG. 18 is a diagrammatic and perspective overall view for illustrating the kinematics of the guiding device according to the embodiment of FIG. 13.

As shown in FIGS. 13 and 14 and in the schematic diagram of FIG. 18, the measuring head 105 is connected via a swinging means 119 to a lower end of the second linear guidance 113. The swinging means 119 allows and causes the measuring head 105 to swing relative to the second linear guidance 113 in such a manner that the laser beam 129 exiting from the measuring head 105 impinges horizontally and vertically on the workpiece surfaces to be respectively scanned.

As becomes apparent from FIG. 18, the measuring means 103 is especially distinguished in that the measuring head 105 of sensor means 104 can be moved and also swung in three axes, so that both a front surface 132 (FIG. 13) and a lateral surface 133 (FIG. 14) of workpiece 101 can be scanned by the single measuring head 105.

The workpiece 101 is measured In compliance with a suitable control system according to which measuring head 105 is guided past the various surfaces of workpiece 101.

An important aspect with respect to the automated storage and removal of workpieces is the sensing of the cross-sectional geometry of workpieces 101. To this end, sensor means 104 is first positioned in a basic position at an end of supporting means 102 outside a collision area with workpiece 101, i.e. the first linear guidance 112 is moved along the longitudinal guidance 109 to such an extent in the longitudinal direction, which is marked in FIG. 18 as the X direction, that measuring head 105 can be guided by in front of the front surface 132 of workpiece 101.

Then, swinging means 119 causes measuring head 105 to swing into an angular position perpendicular to the front surface 132, i.e. in such a manner that the laser beam 129 exiting from measuring head 105 is in parallel with the longitudinal direction X.

In a subsequent step, measuring head 105 is guided past the front surface 132 of the workpiece in parallel with the supporting surface on which workpiece 101 rests. That is, cross slide 110 is moved along the first linear guidance 112 in the Y direction (FIG. 18) with the second linear guidance 113 supported thereon. As a result, the laser beam 129 will impinge on the front surface 132 of the workpiece. As becomes apparent from FIG. 20, this will lead to a change in the signal level of laser sensor 104 when measuring head 105 is guided by. Hence, a first signal change means the beginning of a workpiece contour whereas a last signal change corresponding to a drop in signal level marks the end of the contour. As long as measuring head 105 is guided past workpiece 101, a corresponding path measuring device which is formed by encoder 115 in case of a displacement in the Y direction senses the respective position of the measuring head 105 in which a change in the signal level takes place.

The detected and measured path data are linked with the laser beam measuring signals of laser sensor 104 in a calculation unit of a control unit (not shown in the figures). In this way the control unit first calculates the center (in the Y direction) of the front surface 132 of the workpiece.

In the next step, the measuring head 105 is guided vertically past the front surface 132 of the workpiece through the previously determined center by the second linear guidance 113 being moved relative to the cross slide 110, which is fixed in that case. On the basis of signals from laser sensors 104 in combination with data from the encoder 108 showing the position of the second linear guidance 113, the workpiece height H can be calculated by the control unit in this step.

Although in the embodiment shown in FIGS. 13 and 14 the second linear guidance 113 is moved relative to the cross slide 110, it is also possible to make the second linear guidance 113 stationary relative to slide 110 and to move the sensor means 104 together with the swinging means 119 along the second linear guidance 113. Such a development of the linear guidances is diagrammatically shown in FIG. 18. By analogy, it is of course also possible to ensure the movability of the guiding device in the Y direction through a corresponding movability of the first linear guidance 112 relative to the longitudinal guidance 109. The guiding slide 131 is provided here with a cross slide for slidably supporting the guidance 112.

After the, height H of the workpiece has been determined, the measuring head 5 is guided past the front surface 132 of the workpiece at half the workpiece height H/2 in the Y direction a second time so as to sense a width W of the workpiece. The width W is calculated according to the above-described manner by the control unit on the basis of the laser beam measuring signals in combination with the measured path data of encoder 115.

It should be noted that in the case of hollow material, the wall thickness can also be calculated by scanning the front surface 132 of the workpiece.

Figure 20:
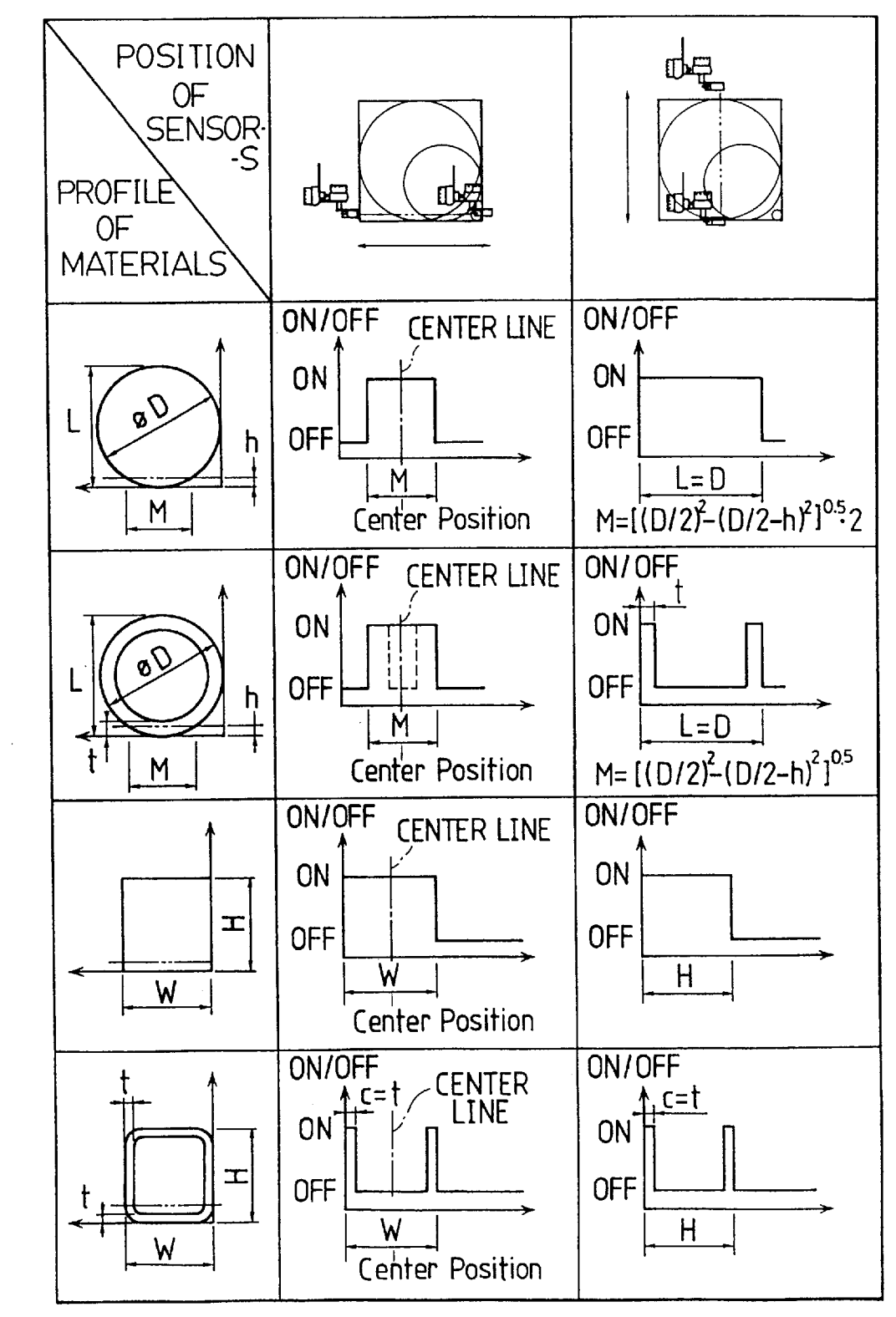

Moreover, the control unit can make distinction between round and flat materials in accordance with an evaluating logic stored in a memory means, as shown in FIG. 20. That is, in contrast to flat material, the corner portion provided between the support surface, which is formed by the conveying chain belts 125, and the bearing surface, which is formed by the pushing bolts 128, are not filled with material in the case of round material. For instance, when the measuring head 105 is guided past the front surface 132 of the workpiece horizontally in the Y direction at a level of slightly more or less than half the workpiece height from the support surface, beginning from the bearing surface of the pushing bolts 128, a first signal change takes place only at a certain distance from the bearing surface of pushing bolts 128. The control unit will therefore recognize that workpiece 101 is a round material. Other paths of movement are possible for making a distinction between round material and flat material.

Furthermore, a multitude of measured data that permit an exact determination of the respective profile of the workpiece by comparison with model data stored in the memory means in the form of a profiled material data base can be obtained for a workpiece of a complicated and irregular geometry through a plurality of scanning operations in parallel with the supporting surface, i.e. in the Y direction, and in parallel with the bearing surface, i.e. in the Z direction.

After sensor means 104 has sensed the cross section of workpiece 101, the swinging means 119 swings the measuring head 105 into the Z direction, so that the laser beam 129 exiting from measuring head 105 is in parallel with the Z direction according to FIG. 18. Further the first linear guidance 112 and the second linear guidance 113 position the measuring head 105 in the Y direction centrally above the workpiece 101. The first linear guidance 112 is then moved along the longitudinal guidance 109 in the X direction, and the measuring head 105 is then guided in the described position in the longitudinal direction over workpiece 101. During displacement in the X direction, the encoder coupled to the toothed belt drive of driving means 107 detects the positions of the measuring head 105 in which a first signal change and a last signal change take place. The control unit calculates length L0 of workpiece 101 from the corresponding laser beam measuring signals and measured path data.

Figure 21:
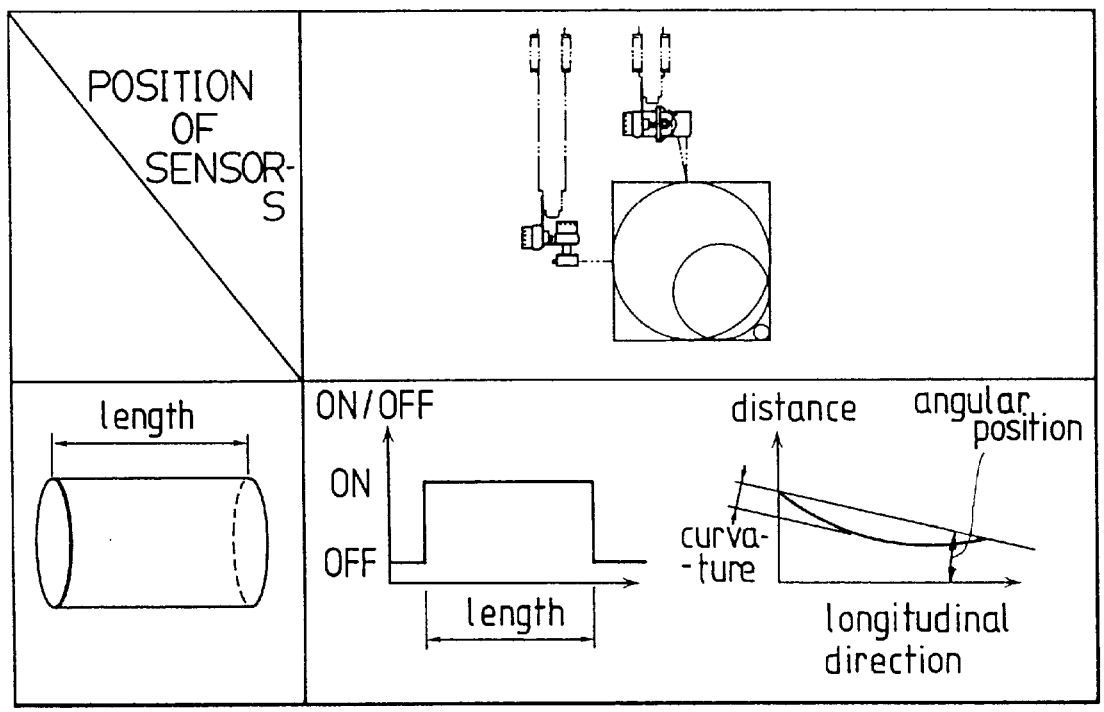
FIG. 21 is a graphic representation, similar to FIG. 20, illustrating the relationship between the signal level of the laser measuring beam of the laser sensor and the position of the laser sensor during scanning of the workpiece in the longitudinal direction thereof for two different positions of the laser sensor according to the embodiments of FIGS. 13 and 19.

During displacement in the X direction, the respective distance of measuring head 105 from the surface of workpiece 101 is measured at fixed intervals so as to determine the straightness and an inclined position of the workpiece in the X-Z plane. To this end, the control unit links the respectively detected distances between the measuring head 105 and the lateral surface of the workpiece 101, with the associated measured path data which are determined by the encoder coupled to the driving means 107, and calculates, as shown in FIG. 21, the angular position and the curvature of the scanned surface line of the workpiece which correspond to the inclined position and the straightness of the workpiece in the X-Z plane. It should be noted that for such a measurement of the straightness of workpiece 101, it is especially the portal-like structure of the guiding device 106 with the longitudinal guidance 109 and the two linear guidances 112 and 113 as well as the encoder directly coupled to the toothed belt drives for direct path measurement that are of special advantage to a high accuracy of the measurements.

In a next step, swinging means 119 swings measuring head 105 into the Y direction in such a manner that the laser beam 129 exiting from measuring head 105 extends in the Y direction, and the first linear guidance 112 and the second linear guidance 113 position the measuring head 105 laterally of workpiece 101 at half the height of workpiece 101. The measuring head 105 is guided in this position in the X direction past workpiece 101 to detect straightness and inclined position of the rod in the X-Y plane according to the above-described manner.

Figure 15:
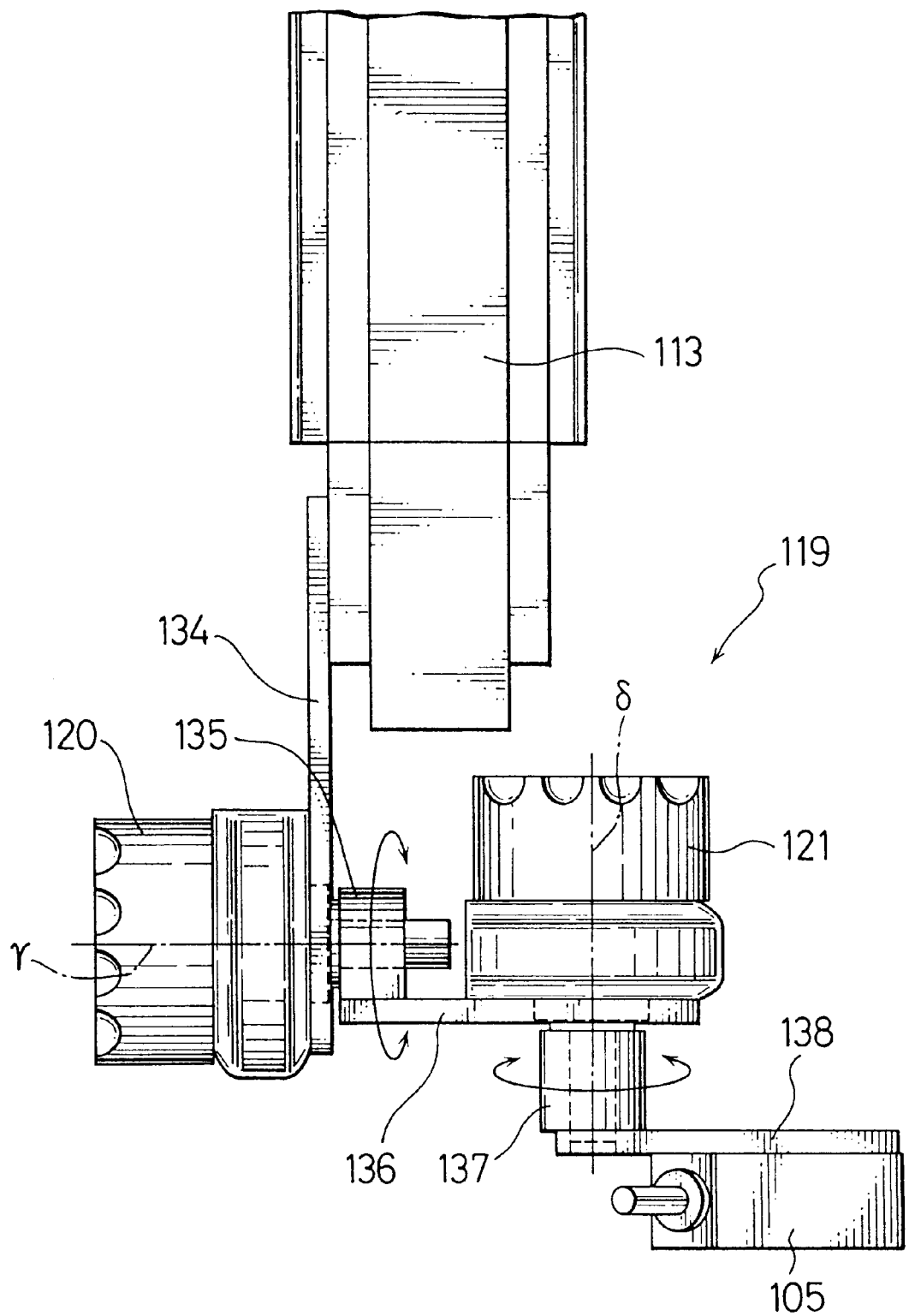
FIG. 15 is a detailed lateral view of a swinging means for swinging a measuring head of the sensor means according to the embodiment of FIG. 13.
Figure 16:
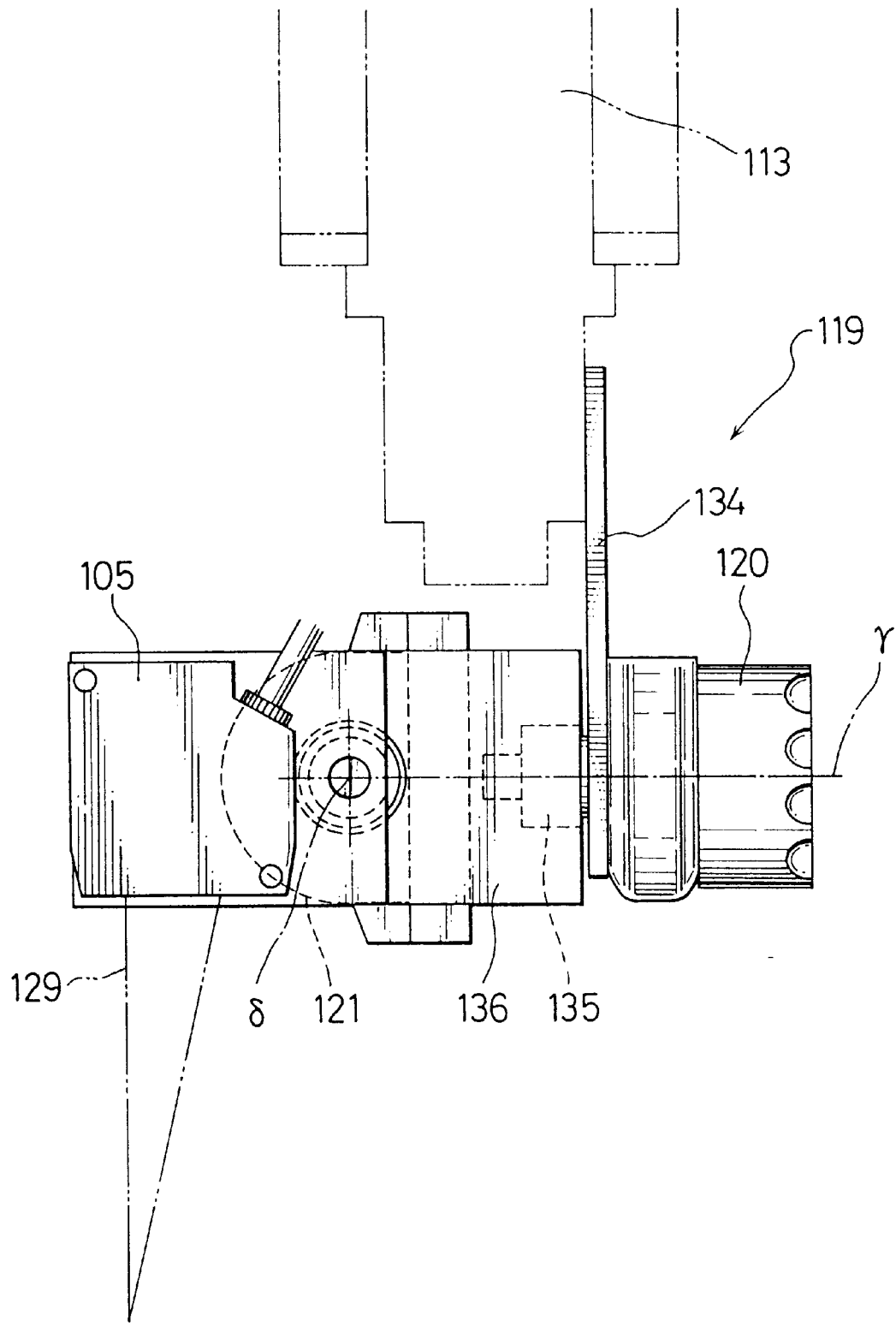
FIG. 16 is a detailed view, similar to FIG. 15, of the swinging means for swinging the measuring head of the sensor means in another swinging position of the measuring head according to the embodiment of FIG. 13.

As shown in FIGS. 15 and 16, the swinging means 119 for swinging the measuring head 105 includes two series connected swinging members 120 and 121 which are each swingable by 90° about a swinging axis γ and δ between two positions. A first swinging member 120 is fixedly connected by means of a holding bracket 134 to a lower end of the second linear guidance 113. A first adjusting ring 135 of the first adjusting member 120 is rotatable by 90° about the swinging axis γ. A second adjusting member 121 is rigidly connected with the aid of a holding bracket 136 to the first adjusting member 135, so that the second adjusting member 121 can be swung by the first adjusting member 120 around swinging axis γ. The second adjusting member 121 possesses a second adjusting ring 137 which is rotatable by 90° about the axis δ. The ring 137 has the measuring head 105 attached thereto via a measuring head holding means 138. The measuring head 105 is swingable about two axes γ, δ due to the series connection of the two swinging members 120 and 121, which can for instance be operated by compressed air or also by rotary field magnets. This solution is especially simple, but nevertheless ensures adequate accuracy. However, it is also possible to support measuring head 105 such that it is swingable in three axes.

Figure 17A:
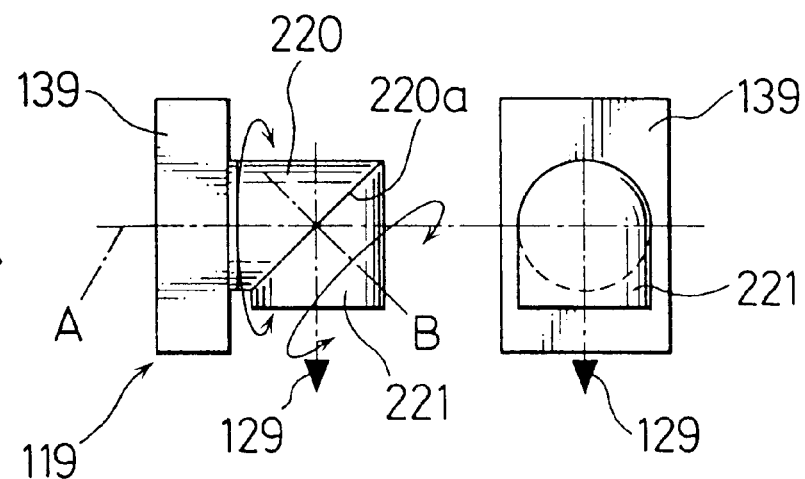
FIGS. 17A, 17B, and 17C are partial views of another swinging means for swinging the measuring head of the sensor means according to the embodiment of the invention in FIG. 13, the swinging means being shown in different positions in a lateral view and front view, respectively.
Figure 17B:
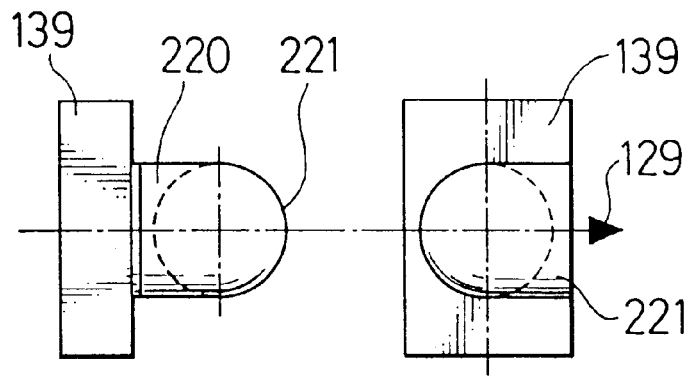
Figure 17C:
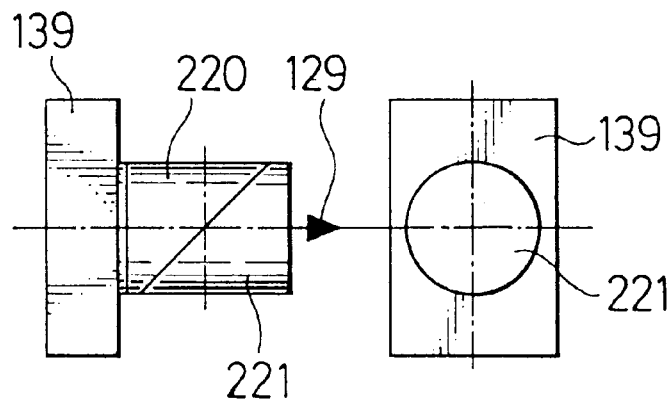

As compared with FIGS. 15 and 16, FIGS. 17A, 17B, and 17C show an alternative embodiment of the swinging means 119 wherein two series connected swinging members 220 and 221 form a pivot/swing joint. A first swinging member 220 is supported on a lateral surface of a holding plate 139, which is rigidly connected to a lower end of the second linear guidance 113, so as to be rotatable about a horizontal axis A. A second swinging member 221 is supported on an inclined surface 220a of the first swinging member 220 so as to be rotatable about an axis B making an angle of 45° with the axis A. With this arrangement, in the position of the swinging members shown in FIG. 17A, the laser beam 129 is directed in the vertical direction. When the first swinging member 220 is rotated through 90° from the foregoing position, the laser beam 129 is rotated and directed to a first horizontal direction perpendicular to the axis A as shown in FIG. 17B. On the other hand, when the second swinging member 221 is rotated through 180° from the foregoing position, the laser beam 29 is rotated and directed to the second horizontal position parallel to the axis A as shown in FIG. 17C.

With the above-described embodiment of an inventive device, it is possible to measure workpieces of very different sizes with a high accuracy. For instance, as outlined in FIG. 18, rods with a length of 800 mm up to a maximum length of 6600 mm can be placed on the supporting means 102 and measured with a maximum error of 1 mm. The supporting length d is about 6600 mm. Height H of the workpiece and width W thereof can each amount up to 320 mm. It is here of particular advantage that the workpiece on the supporting means 102 need not be brought into a defined position, specifically into contact with a stop, but a front surface of the workpiece has just to be positioned within a tolerance range of, for instance, 100 mm. A cumbersome displacement of the workpiece on the supporting surface is thus not necessary.

Figure 19:
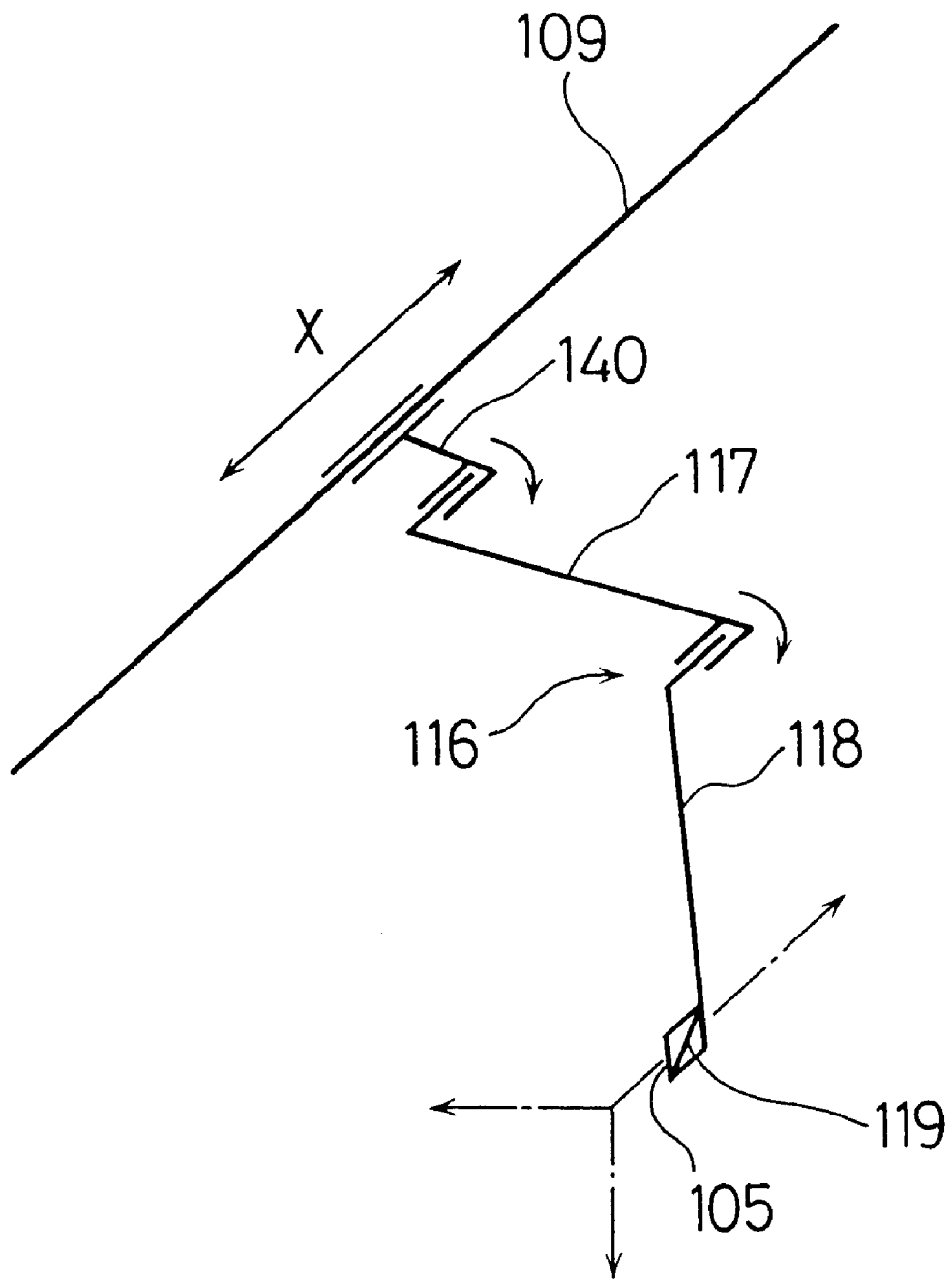
FIG. 19 is a diagrammatic and perspective view for illustrating the kinematics of a guiding device of a device for measuring workpieces in accordance with a fifth embodiment of the invention.

Apart from the above-described embodiment according to FIGS. 13 and 14 with the two linear guidances 112, 113 connected by a cross slide 110, it is also possible, as shown in FIG. 19, to provide a pivotal arm guidance 116 for guiding the measuring head 105 with at least two pivotal arms 117 and 118 in the plane perpendicular to the longitudinal direction of workpiece 101, i.e., in the plane perpendicular to the X direction according to FIG. 19. The pivotal arm guidance 116 is slidably guided on the longitudinal guidance 109 in the longitudinal direction, i.e. in the X direction, by a slide 140 which, similar to guidance slide 131 (see FIG. 14), is slidably supported on the longitudinal guidance 109. A first pivotal arm 117 is pivotally supported relative to the slide 140 about a first axis parallel to the longitudinal direction of the longitudinal guidance 109 and pivotal by a driving means (not shown). A second pivotal arm 118 is supported on the first pivotal arm 117 and adapted to be pivotal relative thereto about a second axis also in parallel with the X axis. A driving means for pivoting the second pivotal arm is not shown, nor are there shown path measuring sensors coupled to the drive for detecting the position of the measuring head 105 which is arranged on the second pivotal arm 118. The measuring head 105 is connected to a lower end of the second pivotal arm 118 via a swinging means 119, which corresponds to one of the above-described embodiments, to swingably support the measuring head 105 relative to the second pivotal arm 118.

The pivotal arm guidance 116, which substantially corresponds to a pivotal arm robot, makes it possible, together with the movable support on the longitudinal guidance 109 and the swinging means 119, to guide the measuring head 105 past the surface of workpiece 101 along different straight lines oriented in any direction. The cross section, length and straightness of the workpiece are detected in the manner as described for the embodiment illustrated in FIG. 13, so that a repeated detailed explanation is omitted.

The above-described embodiments of a device according to the invention for measuring workpieces are, inter alia, distinguished from prior arts by the fact that both the cross section of the workpiece and the length of the workpiece as well as its straightness can be detected by a single sensor means. It should once again be pointed out that it is also possible to arrange several measuring heads on the guiding device, the measuring heads being oriented accordingly for different scanning operations. A swinging means can be dispensed with in such a case.

In the above-mentioned embodiment, the measuring of the workpiece was explained in combination with a cross conveying means through which the workpiece is supplied to a roller conveyor of a processing machine, such as a sawing machine. As for the location of the arrangement of the measuring means, this is of course only an example. The measurement can, for instance, also be performed within the roller conveyor itself, i.e. after the workpiece has been supplied thereto, or within the material store, for instance a cantilever type store (shelf type store) for rod material, or outside the material store to measure workpieces to be supplied to the material store.

We claim:

1. A method for measuring dimensions of a cross-section of a rod shaped workpiece by using sensor means for detecting a surface of the workpiece, the sensor means being movable in two directions parallel to the surface of the workpiece, and a recorder means for recording distances moved by the sensor along paths, characterized in that
   (a) the sensor is moved along a first linear path over the surface of the workpiece, to detect positions of edges of the surface of the workpiece along the first linear path;
   (b) a center position of the surface of the workpiece along the first linear path is calculated by taking mean value of the detected positions;
   (c) the sensor is moved along a second linear path to detect positions of edges of the surface of the workpiece along the second linear path, the second linear path extending in a direction perpendicular to the first linear path and passing through the center position calculated in the step (b); and
   (d) a height of the workpiece is calculated from the positions of the edges of the workpiece surface detected in the step (c).

2. The method according to claim 1, characterized in that
   (e) the sensor is moved along a third linear path over the workpiece surface, which path is parallel to the first linear path and located at half the height of the workpiece from a supporting surface;
   (f) positions of the edges of the surface of the workpiece along the third linear path is detected; and
   (g) a width of the workpiece is calculated from the positions detected in the step (f).

3. The method according to claim 1, characterized in that
   (h) the sensor is moved along a fourth linear path over the workpiece surface, which path is parallel to the first linear path and located at a level of slightly higher and lower than half the workpiece height from a support surface;
   (i) a first position of the edges of the surface of the workpiece along the fourth linear path is detected; and
   (j) a distinction between round and flat material is made from the first position detected in the step (i).

4. The method according to claim 1, characterized in that
   (k) the sensor is moved along a plurality of scanning paths over the workpiece surface in parallel with a supporting surface and in parallel with a bearing surface;
   (l) a plurality of measuring data obtained in the step (k) are compared with model data stored in a storage device to determine a profile of the workpiece.

5. A device for measuring dimensions of a cross-section of rod-shaped workpiece, comprising:
   a frame;
   a support device mounted on the frame for supporting the workpiece;

a sensor for detecting a surface of the workpiece supported by the support device, a first guide extending in a first direction, for supporting the sensor so as to be movable in the first direction, the first direction being parallel to a surface of the workpiece;

a first motor for moving the sensor along the first guide;

a first detector for detecting distances moved by the sensor along the first guide;

a second guide mounted on the frame, extending in a second direction, for supporting the first guide so as to be movable in the second direction, the second direction being parallel to the surface of the workpiece and perpendicular to the first direction;

a second motor for moving the first guide along the second guide;

a second detector for detecting distances moved by the first guide along the second guide; and a first control means for controlling the first and second motors to move the sensor along a first linear path over the surface of the workpiece and for detecting positions of edges of the surface of the workpiece along the first linear path;

a first calculation means for calculating a center position of the surface of the workpiece along the first linear path by a taking mean value of the positions detected by the first control means;

a second control means for controlling the first and second motors to move the sensor along a second linear path over the surface of the workpiece and for detecting positions of edges of the surface of the workpiece along the second path, the second linear path extending in a direction perpendicular to the first linear path and passing through the center position calculated by the first calculation means;

a second calculation means for calculating a height of the workpiece on the basis of the positions of the edges of the workpiece surface detected by the second control means.

6. The device of claim 5, further comprising:

a third control means for controlling the first and second motors to move the sensor along a third linear path over the workpiece surface and for detecting positions of edges of the surface of the workpiece along the third linear path, the third linear path being parallel to the first linear path and located at half the height of the workpiece from a surface of the support device; and a third calculation means for calculating the width of the workpiece on the basis of the positions detected by the third control means.

7. The device of claim 5, further comprising:

a fourth control means for controlling the first and second motors to move the sensor along a fourth linear path over the surface of the workpiece and for detecting positions of the edges of the workpiece surface along the fourth linear path;

means for determining on the basis of the position detected by the fourth control means whether the shape of the supported workpiece is circular or rectangular.

8. The device of claim 5, further comprising:

fifth control means for controlling the first and second motors to move the sensor along a plurality of scanning paths over the surface of the workpiece in parallel with a supporting surface and in parallel with a bearing surface; and means for comparing a plurality of measuring data obtained by the fifth control means with reference data stored in a storing means, to determine a profile of the workpiece.

9. A device for measuring dimensions of a cross-section of a rod-shaped workpiece, comprising:

a frame;

a support device mounted on the frame for supporting the workpiece;

a sensor for detecting a surface of the workpiece, a first guide extending in a first direction, for supporting the sensor so as to be movable in the first direction, the first direction being parallel to a surface of the workpiece;

a first motor for moving the sensor along the first guide;

a first detector for detecting distances moved by the sensor along the first guide;

a second guide mounted on the frame, extending in a second direction, for supporting the first guide so as to be movable in the second direction, the second direction being parallel to the surface of the workpiece and perpendicular to the first direction;

a second motor for moving the first guide along the second guide;

a second detector for detecting distances moved by the first guide along the second guide; and a first control means for controlling the first and second motors to move the sensor along a first linear path over the surface of the workpiece and for detecting positions of the surface of the workpiece along the first linear path;

a first calculation means for calculating a center position of the surface of the workpiece along the first linear path by taking a mean value of the positions detected by the first control means;

a second control means for controlling the first and second motors to move the sensor along a second linear path over the surface of the workpiece and for detecting positions of edges of the surface of the workpiece along the second path, the second linear path extending in a direction perpendicular to the first linear path and passing through the center position calculated by the first calculation means;

a second calculation means for calculating means for calculating a width of the workpiece on the basis of the positions of the edges of the workpiece surface detected by the second control means.

* * * * *

UNITED STATES PATENT AND TRADEMARK OFFICE
CERTIFICATE OF CORRECTION

PATENT NO. : 5,953,127

DATED : September 14, 1999

INVENTOR(S) : Washio et al.

It is certified that error appears in the above-identified patent and that said Letters Patent is hereby corrected as shown below:

On the title page,
After "[62] Division of application No. 08/490,452, Jun. 14, 1995", please insert--

[30]             Foreign Application Data

Jun. 15, 1994   [DE]   Fed. Rep of Germany............. P4420831.6
Aug. 10, 1994   [DE]   Fed. Rep of Germany............. P4428364
Dec. 15, 1994   [DE]   Fed. Rep of Germany............. P4444787.6

Signed and Sealed this

Eleventh Day of July, 2000

Attest:

Q. TODD DICKINSON

*Attesting Officer*          *Director of Patents and Trademarks*